(12) United States Patent
Shen et al.

(10) Patent No.: US 12,355,611 B2
(45) Date of Patent: Jul. 8, 2025

(54) SYSTEM, METHOD, AND COMPUTER PROGRAM PRODUCT FOR DIAGNOSING FAULTY COMPONENTS IN NETWORKED COMPUTER SYSTEMS

(71) Applicant: Visa International Service Association, San Francisco, CA (US)

(72) Inventors: Yi Shen, Fremont, CA (US); Sangram Pattanaik, Hayward, CA (US); Trinath B. Anaparthi, San Ramon, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 18/490,112

(22) Filed: Oct. 19, 2023

(65) Prior Publication Data

US 2024/0048437 A1 Feb. 8, 2024

Related U.S. Application Data

(63) Continuation of application No. 17/591,800, filed on Feb. 3, 2022, now Pat. No. 11,831,487.

(51) Int. Cl.
| | | |
|---|---|---|
| H04L 41/0631 | (2022.01) | |
| G06F 11/22 | (2006.01) | |
| G06F 11/36 | (2025.01) | |
| H04L 41/0659 | (2022.01) | |
| H04L 41/12 | (2022.01) | |

(52) U.S. Cl.
CPC ...... *H04L 41/0631* (2013.01); *H04L 41/0659* (2013.01); *H04L 41/12* (2013.01); *G06F 11/22* (2013.01); *G06F 11/36* (2013.01)

(58) Field of Classification Search
CPC . H04L 41/0631; H04L 41/0659; H04L 41/12; G06F 11/22; G06F 11/36
USPC .......................................................... 714/37
See application file for complete search history.

(56) References Cited

U.S. PATENT DOCUMENTS

| | | |
|---|---|---|
| 6,144,961 A | 11/2000 | de la Salle |
| 7,512,649 B2 | 3/2009 | Faybishenko et al. |
| 8,661,295 B1 | 2/2014 | Khanna et al. |
| 9,032,069 B2 | 5/2015 | Van Biljon et al. |
| 10,681,177 B2 | 6/2020 | Tarasenko et al. |

(Continued)

OTHER PUBLICATIONS

Wikipedia "network topology" page, retrieved from https://en.wikipedia.org/wiki/Network_topology (Year: 2024).*

*Primary Examiner* — Yair Leibovich
(74) *Attorney, Agent, or Firm* — The Webb Law Firm

(57) ABSTRACT

Described are a system, method, and computer program product for diagnosing faulty components in networked computer systems. The method includes generating a graph of a network topology of a networked computer system and determining a set of nodes of the graph affected by a fault in the networked computer system based on an alert associated with the set of nodes. The method also includes determining a faulty component of the networked computer system based on a common node having a plurality of edges connected to nodes in the set of nodes affected by the fault. The method further includes retrieving a set of records of operational changes to the networked computer system and determining an operational change that caused the fault. The method further includes resetting the networked computer system to a prior state before the operational change.

20 Claims, 11 Drawing Sheets

(56) References Cited

U.S. PATENT DOCUMENTS

| | | |
|---|---|---|
| 10,915,417 B1* | 2/2021 | Kumar .................... G06F 17/40 |
| 11,038,766 B2 | 6/2021 | Shen et al. |
| 2004/0215746 A1 | 10/2004 | McCanne et al. |
| 2013/0298192 A1 | 11/2013 | Kumar et al. |
| 2013/0298244 A1 | 11/2013 | Kumar et al. |
| 2015/0055453 A1 | 2/2015 | Chaki et al. |
| 2015/0288557 A1 | 10/2015 | Gates et al. |
| 2015/0319256 A1 | 11/2015 | Casey |
| 2016/0366163 A1 | 12/2016 | Sohn et al. |
| 2017/0116552 A1 | 4/2017 | Deodhar et al. |

* cited by examiner

SYSTEM, METHOD, AND COMPUTER PROGRAM PRODUCT FOR DIAGNOSING FAULTY COMPONENTS IN NETWORKED COMPUTER SYSTEMS

CROSS-REFERENCE TO RELATED APPLICATION

This application is a continuation of U.S. patent application Ser. No. 17/591,800, filed Feb. 3, 2022, titled "System, Method, and Computer Program Product for Diagnosing Faulty Components in Networked Computer Systems", the disclosure of which is incorporated by reference in its entirety.

BACKGROUND

1. Technical Field

This disclosure relates generally to network behavior analysis and, in non-limiting embodiments or aspects, to systems, methods, and computer program products for diagnosing faulty components in networked computer systems.

2. Technical Considerations

Faults (e.g., failures, malfunctions, errors, etc., in software and/or hardware) in a networked computer system may be difficult to trace. Because of the interconnectivity of various software and hardware components, a fault with one component in the system may cause fault messages for a number of interconnected components. This may increase the overall number of fault messages that occur, effectively multiplying the number of messages stemming from a single fault, which not only consumes computational resources but increases the difficulty of identifying and remedying the source of a fault.

Moreover, live systems may undergo periodic system changes (e.g., to the operation and/or accessibility of one or more software and/or hardware components), which may be the root cause of one or more system faults. Such system changes may be carried out by one or more system users. Due to the volume of changes and fault messages that may occur, it may be difficult to pinpoint which changes to the system led to certain faults.

There is a need in the art for a technical solution to improve the efficiency of identifying faulty components in a networked computer system, such that duplicative messages are reduced and/or removed and the time to identify the fault is reduced. There is a further need for identifying one or more changes to the networked computer system that resulted in the fault and facilitating the rectification of faults caused by such changes to the system.

SUMMARY

According to some non-limiting embodiments or aspects, provided is a computer-implemented method for diagnosing faulty components in networked computer systems. The method includes receiving, with at least one processor, a plurality of alerts associated with at least one fault in a networked computer system. The method also includes generating, with at least one processor, a graph of a network topology of the networked computer system including a plurality of nodes connected by a plurality of edges, wherein each node of the plurality of nodes represents at least one of a hardware component or a software component in the networked computer system, and wherein each edge of the plurality of edges represents communication between components represented by nodes connected by said edge. The method further includes associating, with at least one processor, each alert of the plurality of alerts with at least one node of the plurality of nodes to determine a set of nodes affected by the at least one fault. The method further includes determining, with at least one processor, at least one common node of the graph having a plurality of edges connected to nodes in the set of nodes affected by the at least one fault. The method further includes determining, with at least one processor, at least one faulty component of the networked computer system based on the at least one common node. The method further includes retrieving, with at least one processor, a set of records of operational changes to the networked computer system. The method further includes determining, with at least one processor, based on the set of records and the at least one faulty component, at least one operational change that caused the at least one fault in the networked computer system and outputting, with at least one processor, the at least one operational change.

In some non-limiting embodiments or aspects, the plurality of nodes of the graph of the network topology may include a first set of nodes associated with software applications, a second set of nodes associated with data storage devices, and a third set of nodes that connects the first set of nodes to the second set of nodes. The method may further include displaying, with at least one processor, the graph of the network topology on a user interface, wherein each node of the set of nodes affected by the at least one fault is visually represented as distinct from nodes that are not in the set of nodes affected by the at least one fault, and wherein determining the at least one common node is based at least partly on an input in the user interface including a selection of a node of the graph.

In some non-limiting embodiments or aspects, the method may further include, in response to determining the at least one operational change that caused the at least one fault in the networked computer system, determining, with at least one processor, based on the set of records, a prior state of the networked computer system before the at least one operational change was implemented, and executing, with at least one processor, at least one rollback script to revert the networked computer system to the prior state.

In some non-limiting embodiments or aspects, determining the at least one operational change that caused the at least one fault in the networked computer system may further include comparing, with at least one processor, times of the operational changes of the set of records with a time period associated with the plurality of alerts.

In some non-limiting embodiments or aspects, the set of records may further include a user access log that associates each operational change with a user of the networked computer system, and determining the at least one operational change that caused the at least one fault in the networked computer system may further include identifying, with at least one processor, a user that made an operational change to the networked computer system without authorization.

In some non-limiting embodiments or aspects, the method may further include, in response to determining the at least one operational change that caused the at least one fault in the networked computer system, reconfiguring, with at least one processor, the networked computer system to isolate the at least one faulty component and to reconnect components associated with the set of nodes affected by the at least one fault to a new component.

According to some non-limiting embodiments or aspects, provided is a system for diagnosing faulty components in networked computer systems. The system includes a server including at least one processor, the server being programmed or configured to receive a plurality of alerts associated with at least one fault in a networked computer system. The server is further programmed or configured to generate a graph of a network topology of the networked computer system including a plurality of nodes connected by a plurality of edges, wherein each node of the plurality of nodes represents at least one of a hardware component or a software component in the networked computer system, and wherein each edge of the plurality of edges represents communication between components represented by nodes connected by said edge. The server is further programmed or configured to associate each alert of the plurality of alerts with at least one node of the plurality of nodes to determine a set of nodes affected by the at least one fault. The server is further programmed or configured to determine at least one common node of the graph having a plurality of edges connected to nodes in the set of nodes affected by the at least one fault. The server is further programmed or configured to determine at least one faulty component of the networked computer system based on the at least one common node. The server is further programmed or configured to retrieve a set of records of operational changes to the networked computer system. The server is further programmed or configured to determine, based on the set of records and the at least one faulty component, at least one operational change that caused the at least one fault in the networked computer system and output the at least one operational change.

In some non-limiting embodiments or aspects, the plurality of nodes of the graph of the network topology may include a first set of nodes associated with software applications, a second set of nodes associated with data storage devices, and a third set of nodes that connects the first set of nodes to the second set of nodes. The server may be further programmed or configured to display the graph of the network topology on a user interface, wherein each node of the set of nodes affected by the at least one fault is visually represented as distinct from nodes that are not in the set of nodes affected by the at least one fault, and wherein determining the at least one common node is based at least partly on an input in the user interface including a selection of a node of the graph.

In some non-limiting embodiments or aspects, the server may be further programmed or configured to, in response to determining the at least one operational change that caused the at least one fault in the networked computer system, determine, based on the set of records, a prior state of the networked computer system before the at least one operational change was implemented, and execute at least one rollback script to revert the networked computer system to the prior state.

In some non-limiting embodiments or aspects, determining the at least one operational change that caused the at least one fault in the networked computer system may further include comparing times of the operational changes of the set of records with a time period associated with the plurality of alerts.

In some non-limiting embodiments or aspects, the set of records may further include a user access log that associates each operational change with a user of the networked computer system, and determining the at least one operational change that caused the at least one fault in the networked computer system may further include identifying a user that made an operational change to the networked computer system without authorization.

In some non-limiting embodiments or aspects, the server may be further programmed or configured to, in response to determining the at least one operational change that caused the at least one fault in the networked computer system, reconfigure the networked computer system to isolate the at least one faulty component and to reconnect components associated with the set of nodes affected by the at least one fault to a new component.

According to some non-limiting embodiments or aspects, provided is a computer program product for diagnosing faulty components in networked computer systems. The computer program product includes at least one non-transitory computer-readable medium including program instructions that, when executed by at least one processor, cause the at least one processor to receive a plurality of alerts associated with at least one fault in a networked computer system. The program instructions further cause the at least one processor to generate a graph of a network topology of the networked computer system including a plurality of nodes connected by a plurality of edges, wherein each node of the plurality of nodes represents at least one of a hardware component or a software component in the networked computer system, and wherein each edge of the plurality of edges represents communication between components represented by nodes connected by said edge. The program instructions further cause the at least one processor to associate each alert of the plurality of alerts with at least one node of the plurality of nodes to determine a set of nodes affected by the at least one fault. The program instructions further cause the at least one processor to determine at least one common node of the graph having a plurality of edges connected to nodes in the set of nodes affected by the at least one fault. The program instructions further cause the at least one processor to determine at least one faulty component of the networked computer system based on the at least one common node. The program instructions further cause the at least one processor to retrieve a set of records of operational changes to the networked computer system. The program instructions further cause the at least one processor to determine, based on the set of records and the at least one faulty component, at least one operational change that caused the at least one fault in the networked computer system and output the at least one operational change.

In some non-limiting embodiments or aspects, the plurality of nodes of the graph of the network topology may include a first set of nodes associated with software applications, a second set of nodes associated with data storage devices, and a third set of nodes that connects the first set of nodes to the second set of nodes. The program instructions may further cause the at least one processor to display the graph of the network topology on a user interface, wherein each node of the set of nodes affected by the at least one fault is visually represented as distinct from nodes that are not in the set of nodes affected by the at least one fault, and wherein determining the at least one common node is based at least partly on an input in the user interface including a selection of a node of the graph.

In some non-limiting embodiments or aspects, the program instructions may further cause the at least one processor to, in response to determining the at least one operational change that caused the at least one fault in the networked computer system, determine, based on the set of records, a prior state of the networked computer system before the at least one operational change was implemented, and execute, at least one rollback script to revert the networked computer system to the prior state.

In some non-limiting embodiments or aspects, determining the at least one operational change that caused the at least one fault in the networked computer system further may include comparing times of the operational changes of the set of records with a time period associated with the plurality of alerts.

In some non-limiting embodiments or aspects, the set of records may further include a user access log that associates each operational change with a user of the networked computer system, and determining the at least one operational change that caused the at least one fault in the networked computer system may further include identifying a user that made an operational change to the networked computer system without authorization.

In some non-limiting embodiments or aspects, the program instructions may further cause the at least one processor to, in response to determining the at least one operational change that caused the at least one fault in the networked computer system, reconfigure the networked computer system to isolate the at least one faulty component and to reconnect components associated with the set of nodes affected by the at least one fault to a new component.

Other non-limiting embodiments or aspects will be set forth in the following numbered clauses:

Clause 1: A computer-implemented method comprising: receiving, with at least one processor, a plurality of alerts associated with at least one fault in a networked computer system; generating, with at least one processor, a graph of a network topology of the networked computer system comprising a plurality of nodes connected by a plurality of edges, wherein each node of the plurality of nodes represents at least one of a hardware component or a software component in the networked computer system, and wherein each edge of the plurality of edges represents communication between components represented by nodes connected by said edge; associating, with at least one processor, each alert of the plurality of alerts with at least one node of the plurality of nodes to determine a set of nodes affected by the at least one fault; determining, with at least one processor, at least one common node of the graph having a plurality of edges connected to nodes in the set of nodes affected by the at least one fault; determining, with at least one processor, at least one faulty component of the networked computer system based on the at least one common node; retrieving, with at least one processor, a set of records of operational changes to the networked computer system; determining, with at least one processor, based on the set of records and the at least one faulty component, at least one operational change that caused the at least one fault in the networked computer system; and outputting, with at least one processor, the at least operational change.

Clause 2: The computer-implemented method of clause 1, wherein the plurality of nodes of the graph of the network topology comprises a first set of nodes associated with software applications, a second set of nodes associated with data storage devices, and a third set of nodes that connects the first set of nodes to the second set of nodes.

Clause 3: The computer-implemented method of clause 1 or clause 2, further comprising displaying, with at least one processor, the graph of the network topology on a user interface, wherein each node of the set of nodes affected by the at least one fault is visually represented as distinct from nodes that are not in the set of nodes affected by the at least one fault, and wherein determining the at least one common node is based at least partly on an input in the user interface comprising a selection of a node of the graph.

Clause 4: The computer-implemented method of any of clauses 1-3, further comprising, in response to determining the at least one operational change that caused the at least one fault in the networked computer system: determining, with at least one processor, based on the set of records, a prior state of the networked computer system before the at least one operational change was implemented; and executing, with at least one processor, at least one rollback script to revert the networked computer system to the prior state.

Clause 5: The computer-implemented method of any of clauses 1-4, wherein determining the at least one operational change that caused the at least one fault in the networked computer system further comprises comparing, with at least one processor, times of the operational changes of the set of records with a time period associated with the plurality of alerts.

Clause 6: The computer-implemented method of any of clauses 1-5, wherein the set of records further comprises a user access log that associates each operational change with a user of the networked computer system, and wherein determining the at least one operational change that caused the at least one fault in the networked computer system further comprises identifying, with at least one processor, the user that made an operational change to the networked computer system without authorization.

Clause 7: The computer-implemented method of any of clauses 1-6, further comprising, in response to determining the at least one operational change that caused the at least one fault in the networked computer system, reconfiguring, with at least one processor, the networked computer system to isolate the at least one faulty component and to reconnect components associated with the set of nodes affected by the at least one fault to a new component.

Clause 8: A system comprising a server comprising at least one processor, the server being programmed or configured to: receive a plurality of alerts associated with at least one fault in a networked computer system; generate a graph of a network topology of the networked computer system comprising a plurality of nodes connected by a plurality of edges, wherein each node of the plurality of nodes represents at least one of a hardware component or a software component in the networked computer system, and wherein each edge of the plurality of edges represents communication between components represented by nodes connected by said edge; associate each alert of the plurality of alerts with at least one node of the plurality of nodes to determine a set of nodes affected by the at least one fault; determine at least one common node of the graph having a plurality of edges connected to nodes in the set of nodes affected by the at least one fault; determine at least one faulty component of the networked computer system based on the at least one common node; retrieve a set of records of operational changes to the networked computer system; determine, based on the set of records and the at least one faulty component, at least one operational change that caused the at least one fault in the networked computer system; and output the at least one operational change.

Clause 9: The system of clause 8, wherein the plurality of nodes of the graph of the network topology comprises a first set of nodes associated with software applications, a second set of nodes associated with data storage devices, and a third set of nodes that connects the first set of nodes to the second set of nodes.

Clause 10: The system of clause 8 or clause 9, wherein the server is further programmed or configured to display the graph of the network topology on a user interface, wherein each node of the set of nodes affected by the at least one fault is visually represented as distinct from nodes that are not in the set of nodes affected by the at least one fault, and wherein determining the at least one common node is based at least partly on an input in the user interface comprising a selection of a node of the graph.

Clause 11: The system of any of clauses 8-10, wherein the server is further programmed or configured to, in response to determining the at least one operational change that caused the at least one fault in the networked computer system: determine, based on the set of records, a prior state of the networked computer system before the at least one operational change was implemented; and execute at least one rollback script to revert the networked computer system to the prior state.

Clause 12: The system of any of clauses 8-11, wherein determining the at least one operational change that caused the at least one fault in the networked computer system further comprises comparing times of the operational changes of the set of records with a time period associated with the plurality of alerts.

Clause 13: The system of any of clauses 8-12, wherein the set of records further comprises a user access log that associates each operational change with a user of the networked computer system, and wherein determining the at least one operational change that caused the at least one fault in the networked computer system further comprises identifying the user that made an operational change to the networked computer system without authorization.

Clause 14: The system of any of clauses 8-13, wherein the server is further programmed or configured to, in response to determining the at least one operational change that caused the at least one fault in the networked computer system, reconfigure the networked computer system to isolate the at least one faulty component and to reconnect components associated with the set of nodes affected by the at least one fault to a new component.

Clause 15: A computer program product comprising at least one non-transitory computer-readable medium including program instructions that, when executed by at least one processor, cause the at least one processor to: receive a plurality of alerts associated with at least one fault in a networked computer system; generate a graph of a network topology of the networked computer system comprising a plurality of nodes connected by a plurality of edges, wherein each node of the plurality of nodes represents at least one of a hardware component or a software component in the networked computer system, and wherein each edge of the plurality of edges represents communication between components represented by nodes connected by said edge; associate each alert of the plurality of alerts with at least one node of the plurality of nodes to determine a set of nodes affected by the at least one fault; determine at least one common node of the graph having a plurality of edges connected to nodes in the set of nodes affected by the at least one fault; determine at least one faulty component of the networked computer system based on the at least one common node; retrieve a set of records of operational changes to the networked computer system; determine, based on the set of records and the at least one faulty component, at least one operational change that caused the at least one fault in the networked computer system; and output the at least one operational change.

Clause 16: The computer program product of clause 15, wherein the plurality of nodes of the graph of the network topology comprises a first set of nodes associated with software applications, a second set of nodes associated with data storage devices, and a third set of nodes that connects the first set of nodes to the second set of nodes, and wherein the program instructions further cause the at least one processor to display the graph of the network topology on a user interface, wherein each node of the set of nodes affected by the at least one fault is visually represented as distinct from nodes that are not in the set of nodes affected by the at least one fault, and wherein determining the at least one common node is based at least partly on an input in the user interface comprising a selection of a node of the graph.

Clause 17: The computer program product of clause 15 or clause 16, wherein the program instructions further cause the at least one processor to, in response to determining the at least one operational change that caused the at least one fault in the networked computer system: determine, based on the set of records, a prior state of the networked computer system before the at least one operational change was implemented; and execute, at least one rollback script to revert the networked computer system to the prior state.

Clause 18: The computer program product of any of clauses 15-17, wherein determining the at least one operational change that caused the at least one fault in the networked computer system further comprises comparing times of the operational changes of the set of records with a time period associated with the plurality of alerts.

Clause 19: The computer program product of any of clauses 15-18, wherein the set of records further comprises a user access log that associates each operational change with a user of the networked computer system, and wherein determining the at least one operational change that caused the at least one fault in the networked computer system further comprises identifying a user that made an operational change to the networked computer system without authorization.

Clause 20: The computer program product of any of clauses 15-19, wherein the program instructions further cause the at least one processor to, in response to determining the at least one operational change that caused the at least one fault in the networked computer system, reconfigure the networked computer system to isolate the at least one faulty component and to reconnect components associated with the set of nodes affected by the at least one fault to a new component.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the present disclosure. As used in the specification and the claims, the singular form of "a," "an," and "the" include plural referents unless the context clearly dictates otherwise.

BRIEF DESCRIPTION OF THE DRAWINGS

Additional advantages and details of the disclosure are explained in greater detail below with reference to the exemplary embodiments that are illustrated in the accompanying figures, in which.

Figure 1:
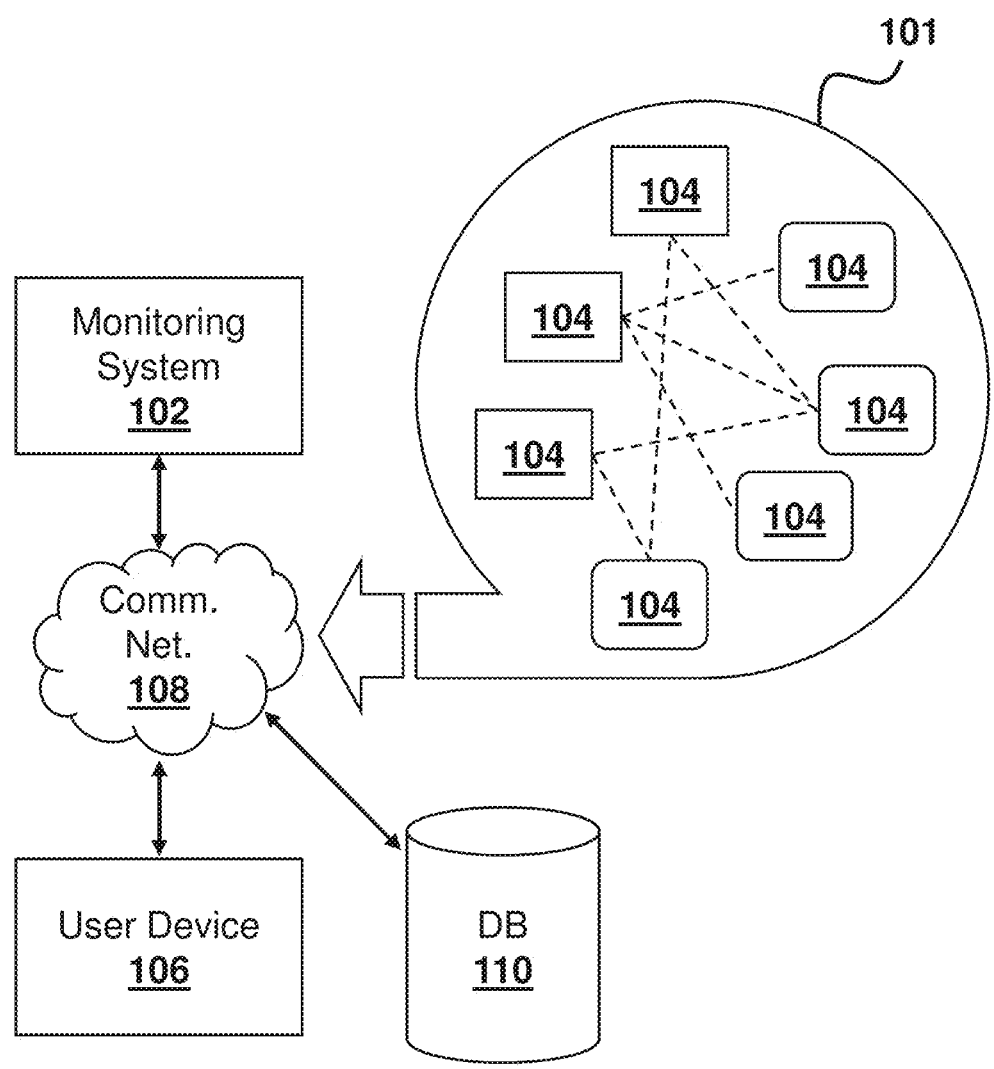
FIG. 1 is a schematic diagram of a system for diagnosing faulty components in networked computer systems, according to some non-limiting embodiments or aspects.

It should be appreciated by those skilled in the art that any block diagrams herein represent conceptual views of illustrative systems embodying the principles of the present subject matter. Similarly, it may be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

For purposes of the description hereinafter, the terms "upper", "lower", "right", "left", "vertical", "horizontal", "top", "bottom", "lateral", "longitudinal," and derivatives thereof shall relate to non-limiting embodiments or aspects as they are oriented in the drawing figures. However, it is to be understood that non-limiting embodiments or aspects may assume various alternative variations and step sequences, except where expressly specified to the contrary. It is also to be understood that the specific devices and processes illustrated in the attached drawings, and described in the following specification, are simply exemplary embodiments or aspects. Hence, specific dimensions and other physical characteristics related to the embodiments or aspects disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

Some non-limiting embodiments or aspects are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, and/or the like.

As used herein, the term "acquirer institution" may refer to an entity licensed and/or approved by a transaction service provider to originate transactions (e.g., payment transactions) using a payment device associated with the transaction service provider. The transactions the acquirer institution may originate may include payment transactions (e.g., purchases, original credit transactions (OCTs), account funding transactions (AFTs), and/or the like). In some non-limiting embodiments or aspects, an acquirer institution may be a financial institution, such as a bank. As used herein, the term "acquirer system" may refer to one or more computing devices operated by or on behalf of an acquirer institution, such as a server computer executing one or more software applications.

As used herein, the term "account identifier" may include one or more primary account numbers (PANs), tokens, or other identifiers associated with a customer account. The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifier in one or more data structures (e.g., one or more databases, and/or the like) such that they may be used to conduct a transaction without directly using the original account identifier. In some examples, an original account identifier, such as a PAN, may be associated with a plurality of tokens for different individuals or purposes.

As used herein, the term "communication" may refer to the reception, receipt, transmission, transfer, provision, and/ or the like, of data (e.g., information, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit processes information received from the first unit and communicates the processed information to the second unit.

As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. A computing device may also be a desktop computer or other form of non-mobile computer. An "application" or "application program interface" (API) may refer to computer code or other data sorted on a computer-readable medium that may be executed by a processor to facilitate the interaction between software components, such as a client-side front-end and/or server-side back-end for receiving data from the client. An "interface" may refer to a generated display, such as one or more graphical user interfaces (GUIs) with which a user may interact, either directly or indirectly (e.g., through a keyboard, mouse, etc.).

As used herein, the terms "electronic wallet" and "electronic wallet application" refer to one or more electronic devices and/or software applications configured to initiate and/or conduct payment transactions. For example, an electronic wallet may include a mobile device executing an electronic wallet application, and may further include server-side software and/or databases for maintaining and providing transaction data to the mobile device. An "electronic wallet provider" may include an entity that provides and/or maintains an electronic wallet for a customer, such as Google Pay®, Android Pay®, Apple Pay®, Samsung Pay®, and/or other like electronic payment systems. In some non-limiting examples, an issuer bank may be an electronic wallet provider.

As used herein, the term "issuer institution" may refer to one or more entities, such as a bank, that provide accounts to customers for conducting transactions (e.g., payment transactions), such as initiating credit and/or debit payments. For example, an issuer institution may provide an account identifier, such as a PAN, to a customer that uniquely identifies one or more accounts associated with that customer. The account identifier may be embodied on a portable financial device, such as a physical financial instrument, e.g., a payment card, and/or may be electronic and used for electronic payments. The term "issuer system" refers to one or more computer devices operated by or on behalf of an issuer institution, such as a server computer executing one or more software applications. For example, an issuer system may include one or more authorization servers for authorizing a transaction.

As used herein, the term "merchant" may refer to an individual or entity that provides goods and/or services, or access to goods and/or services, to customers based on a transaction, such as a payment transaction. The term "merchant" or "merchant system" may also refer to one or more computer systems operated by or on behalf of a merchant, such as a server computer executing one or more software applications. A "point-of-sale (POS) system," as used herein, may refer to one or more computers and/or peripheral devices used by a merchant to engage in payment transactions with customers, including one or more card readers, scanning devices (e.g., code scanners), Bluetooth® communication receivers, near-field communication (NFC) receivers, radio frequency identification (RFID) receivers, and/or other contactless transceivers or receivers, contact-based receivers, payment terminals, computers, servers, input devices, and/or other like devices that can be used to initiate a payment transaction.

As used herein, the term "payment device" may refer to a payment card (e.g., a credit or debit card), a gift card, a smartcard, smart media, a payroll card, a healthcare card, a wristband, a machine-readable medium containing account information, a keychain device or fob, an RFID transponder, a retailer discount or loyalty card, a cellular phone, an electronic wallet mobile application, a PDA, a pager, a security card, a computing device, an access card, a wireless terminal, a transponder, and/or the like. In some non-limiting embodiments or aspects, the payment device may include volatile or non-volatile memory to store information (e.g., an account identifier, a name of the account holder, and/or the like).

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like, operated by or on behalf of a payment gateway.

As used herein, the term "server" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, POS devices, mobile devices, etc.) directly or indirectly communicating in the network environment may constitute a "system." Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa® or any other entity that processes transactions. The term "transaction processing system" may refer to one or more computer systems operated by or on behalf of a transaction service provider, such as a transaction processing server executing one or more software applications. A transaction processing server may include one or more processors and, in some non-limiting embodiments or aspects, may be operated by or on behalf of a transaction service provider.

As used herein, an electronic payment processing network may refer to the communications between one or more entities for processing the transfer of monetary funds to one or more transactions. The electronic payment processing network may include a merchant system, an acquirer system, a transaction service provider, and an issuer system.

The systems, methods, and computer program products described herein provide numerous technical advantages in systems for diagnosing faulty components in networked computer systems. For example, fault detection systems often incur excess computational cost generating and evaluating a plurality of generated fault alerts, particularly where one faulty system component (e.g., hardware and/or software component) affects more than one other node in the underlying networked computer system. The present disclosure provides numerous direct technical improvements by reducing the number of alert messages to be analyzed and reducing the overall time to faulty component detection. Also provided herein is a unique graphical representation of a network topology, in which system alerts are correlated with system components and visualized in an improved representation that assists users in identifying commonalities (e.g., common affected nodes) in system faults. The described systems and methods directly reduce the amount of system or system component downtime due to excess time in diagnosing and resolving faulty components.

Moreover, the present disclosure further provides for automatic detection of system changes that caused the system faults. By processing alerts, identifying common network components, and comparing the detected faults to a set of records of system changes, the described systems and methods can identify the changes that led to the faulty hardware and/or software components. Additionally, the present disclosure provides for executing automatic scripts to either reconfigure the system (e.g., isolate the faulty component and reconnect other system components) or rollback the system to a prior state (e.g., before the change that caused the fault was implemented). In doing so, the present disclosure provides for a faster and more precise fault resolution system, which saves on computational resources and reduces system downtime.

The importance of maintaining system uptime is readily apparent when considering electronic payment processing networks. It is critical that the systemic backbone for the hundreds of millions of transactions that are processed every day has as many system components operational as possible. If any aspect of the electronic payment processing network experiences a fault, it is imperative that the fault be identified and remedied as quickly as possible, so as to minimize both economic costs and computational resource costs (e.g., bandwidth, processing, time, etc.).

Referring now to FIG. 1, a system 100 for diagnosing faulty components in networked computer systems is shown, according to some non-limiting embodiments or aspects. Specifically, the illustrated system 100 is configured to monitor a networked computer system 101. The networked computer system 101 may include a plurality of system components 104, which may be hardware and/or software components. Hardware components may include computing devices, such as processing servers, data storage devices, routers, switches, networking equipment, and/or the like. Software components may include applications, operating systems, database software, user interfacing software, security software, and/or the like. It will be appreciated that many other types of hardware and software components, and combinations thereof, may be considered to be system components 104 in a networked computer system 101 for the purposes of the present disclosure. While seven system components 104 are depicted for the purposes of illustration, any plurality of networked components may be included in the networked computer system 101.

The system 100 may further include a monitoring system 102. Monitoring system 102 may include one or more computing devices configured to communicate with one or more system components 104 of the networked computer system 101, user device 106, and/or database 110. Monitoring system 102 may communicate at least partly via the communication network 108. Monitoring system 102 may include and/or be in communication with one or more data sources (e.g., database 110) including data pertaining to the operation of the networked computer system 101, as further detailed in FIG. 9.

The system may further include a user device 106. User device 106 may include one or more computing devices configured to communicate with one or more system components 104 of the networked computer system 101, monitoring system 102, and/or database 110. User device 106 may communicate at least partly via the communication network 108. User device 106 may be configured with a user interface (e.g., a graphical user interface (GUI)) and a display to show graphs of network topology, as further detailed in FIGS. 6 and 7. A GUI may include one or more windows (e.g., a first GUI, a second GUI, a third GUI, etc.) within a main GUI or as separate GUIs. User device 106 may also be configured to receive user input, such as a selection of one or more nodes in a graph of network topology. Such user input may be at least partly used to identify faulty network components (e.g., troubleshooting) and/or remedy the faulty network components (e.g., reconfigure the networked computer system 101, rollback the networked computer system 101, etc.).

The system may further include a database 110. Database 110 may include one or more computing devices (including one or more databases) configured to communicate with one or more system components 104 of the networked computer system 101, monitoring system 102, and/or user device 106. Database 110 may be configured to store data of operations and changes to the networked computer system 101. For example, database 110 may store a set of records of system changes, a user access log, and/or the like. Database 110 may further generate and/or store rollback scripts for each system change in a set of records of system changes, so that a change to the networked computer system 101 may be rolled back to a prior state of the networked computer system 101 (e.g., before the change was implemented). Database 110 may further be associated with one or more data sources, as further detailed in FIG. 9.

The system may further include a communication network 108. Communication network 108 may include one or more wired and/or wireless networks. For example, communication network 108 may include a cellular network (e.g., a long-term evolution (LTE®) network, a third generation (3G) network, a fourth generation (4G) network, a fifth generation (5G) network, a code division multiple access (CDMA) network, and/or the like), a public land mobile network (PLMN), a local area network (LAN), a wide area network (WAN), a metropolitan area network (MAN), a telephone network (e.g., the public switched telephone network (PSTN)), a private network, an ad hoc network, a mesh network, a beacon network, an intranet, the Internet, a fiber optic-based network, a cloud computing network, and/or the like, and/or a combination of these or other types of networks.

Monitoring system 102 may be configured to receive a plurality of alerts associated with at least one fault in a networked computer system 101. An alert may include one or more communication (e.g., an alert message) identifying one or more aspect of a system fault, such as a system component 104 that is experiencing a fault, the nature of the detected fault, the time of the fault, and/or the like. A fault, as described herein, may include one or more failures, malfunctions, errors, and/or the like in the operation of software and/or hardware of a system component. A fault in one system component 104 may be caused by a fault in another system component 104. A faulty component, as used herein, may be used to refer to a system component 104 that is experiencing at least one fault. In some non-limiting embodiments or aspects, the present disclosure provides a technical solution to identify a common (e.g., root cause) faulty component that may be contributing to faults over a plurality of system components 104.

Monitoring system 102 may be further configured to generate a graph of a network topology of the networked computer system 101. Exemplary depictions of a graph are shown in further detail in FIGS. 6 and 7. A graph of network topology may include a plurality of nodes connected by a plurality of edges. Each node of the plurality of nodes may represent and be associated with at least one system component 104 of the networked computer system 101. Each edge of the plurality of edges may represent and be associated with communication (e.g., a communicative connection) between components represented by nodes that are connected by said edge. In this manner, the graph of network topology may depict various system components 104 as nodes and their preconfigured channels of communication as edges connecting those nodes. One node that is connected to another node by an edge may be said to communicate with the other node. An edge may further represent a communicative connection that is necessary for the operation of the networked computer system 101.

Monitoring system 102 may be further configured to associate each alert of the plurality of alerts with at least one node of the plurality of nodes. For example, monitoring system 102 may evaluate the alert data of an alert message and determine that it is associated with a fault occurring in a particular system component 104 (e.g., the alert was generated in response to the occurrence of a fault in the system component 104). The monitoring system 102 may then associate said alert with the system component 104 that has a fault that triggered the alert. Multiple alerts may be received and associated with a same system component 104. One alert may be received and associated with a plurality of system components 104. It will be appreciated that by associating alerts with nodes in the graph of network topology, monitoring system 102 may determine a set of nodes that are affected by at least one fault, since the nodes are associated with alerts that were triggered in response to one or more faults. In some non-limiting embodiments or aspects, the set of nodes affected by the at least one fault may be referred to as a set of affected nodes, which may correspond to a set of faulty components.

Monitoring system 102 may be further configured to determine at least one common node of the graph having a plurality of edges connected to nodes in the set of affected nodes. For example, monitoring system 102 may determine that a first node (corresponding to a first system component 104) may have a plurality of edges connected to a plurality of other nodes that are in the set of affected nodes. This first node may be referred to as a common node, because the other affected nodes connected to it may be said to have the first node in common (e.g., in terms of communication). The at least one common node may also be identified by tracing a plurality of paths in the graph from a plurality of affected nodes to a single node that is connected to each affected node by at least one path.

Monitoring system 102 may be further configured to retrieve a set of records of operational changes (e.g., a change record) to the networked computer system 101. The set of records may further include and/or be associated with a user access log. The set of operational changes may include a record of one or more changes to the operation (e.g., software programming, hardware configuration, etc.) of one or more system components 104. The user access log may include data of user access to and/or modification of networked computer system 101. User access data may include, but is not limited to, a user identifier, a user access time, a user operational change identifier (e.g., which may be associated with a record of an operational change in the set of operational changes), a user authorization level (e.g., a scope of permissions to make operational changes), and/or the like. The set of records of operational changes may include change data including, but not limited to, a system component 104 identifier, a user identifier, a user access log entry identifier, a time of operational change, a type of operational change (e.g., code change, operational parameter change, communicative connection change, etc.), a description of operational change, and/or the like. It will be further appreciated that the set of operational changes and a user access log may be included in a same data store. Monitoring system 102 may retrieve the set of records from database 110.

Monitoring system 102 may be further configured to determine at least one operational change that caused the at least one fault in the networked computer system 101. This determination may be based on the set of records, which were previously retrieved, and based on the at least one faulty component, which was previously determined based on the determination of the at least one common node. For example, monitoring system 102 may evaluate the set of records to determine one or more operational changes to a system component 104 that was determine to be faulty. Monitoring system 102 may further evaluate the set of records to determine an operational change that occurred around and/or before the time that alerts were received for the faulty components, via a comparison of times of operational changes and times of alerts. Monitoring system 102 may further evaluate the set of records to determine an operational change that occurred by a user who was unauthorized to make the operational change, based on the type of operational change. One or more of the above-described evaluation, and/or the like, may be used as a basis to determine an operational change that caused one or more faults in system components 104 in the networked computer system 101. The monitoring system 102 may be further configured to output the at least one operational change, such as to a user device 106 or other computing device configured to remedy one or more faults based on the operational change.

Figure 7:
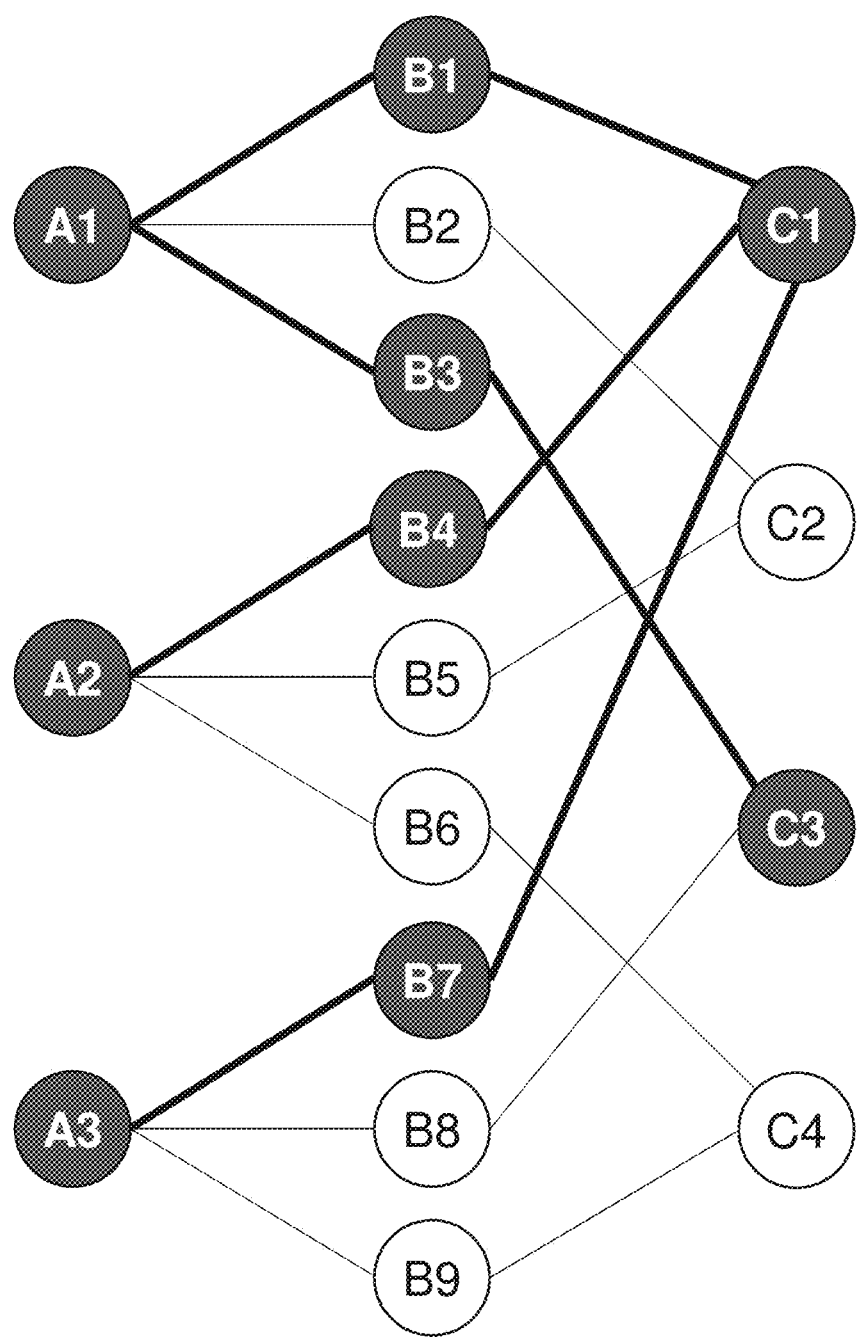
FIG. 7 is an illustrative graph of a network topology for use in a method for diagnosing faulty components in networked computer systems, according to some non-limiting embodiments or aspects.

Monitoring system 102 may be further configured to display the graph of network topology on a user interface. For example, monitoring system 102 may generate display data configured to cause a display of a computing device (e.g., user device 106) to display the graph of network topology, and may communicate said display data to the computing device so as to cause the computing device to show the graph of network topology on the display. In some non-limiting embodiments or aspects, the graph of network topology may be displayed to distinguish system components 104 that are and are not affected by faults. For example, each node of the set of affected nodes may be visually represented as distinct from nodes that are not in the set of affected nodes. The visual distinction may be provided by a difference in color, size, movement, outline, highlighting, font style, position, and/or the like, for the affected node in comparison to a non-affected node. An example distinction is illustrated in FIG. 7. A user of a user device 106 that depicts the graph of network topology may input a selection of a node of the graph, such as with a mouse, keyboard, and/or other input device. The selection may be received and used by the monitoring system 102 as part of determining the common node of the set of affected nodes. For example, the user may be prompted, in a manual troubleshooting process, to identify a node having a plurality of paths and/or edges that connect to a plurality of affected nodes. The user may then identify (e.g., via user input) what the user believes to be one or more common nodes associated with faulty components that may be contributing to faults in other system components 104.

Monitoring system 102 may be further configured to execute a fault mitigation process in response to the determination of at least one operational change that caused the at least one fault in the networked computer system 101. The fault mitigation process may include determine a prior state of the networked computer system 101 from before the at least one operational change was implemented. For example, monitoring system 102 may evaluate the set of records to identify one or more prior states (e.g., a set of configurations, set of operational parameters, and/or the like) of the networked computer system that existed prior to the at least one operational change being implemented. Monitoring system 102 may then execute at least one rollback script to revert the networked computer system 101 to the prior state. For example, each operational change in the set of records may be associated with an automatically generated rollback script that is generated by the monitoring system 102 at the time the operational change is implemented. The rollback script may be configured to reset the networked computer system 101 directly to the prior state associated with the rollback script. The rollback script may also be configured to reset the networked computer system 101 to the prior state by way of executing one or more (e.g., all) rollback scripts that exist for states between the prior state and the current state of the networked computer system 101. In this manner, monitoring system 102 may undo the at least one operational change that caused one or more faults in the networked computer system 101.

The fault mitigation process executed by the monitoring system 102 may further include reconfiguring the networked computer system 101 to isolate the at least one faulty component and to reconnect components associated with affected nodes to a new component not associated with the at least one common node. In this manner, the faulty component associated with the common node may be taken offline and the other system components 104 may be reconnected to communicate with system components 104 of the same type as the faulty component. This may allow the networked computer system 101 to continue to operate, e.g., until the faulty component is reconfigured/repaired, and/or until a rollback script may be executed to reset the networked computer system 101 to a prior state.

Figure 2:
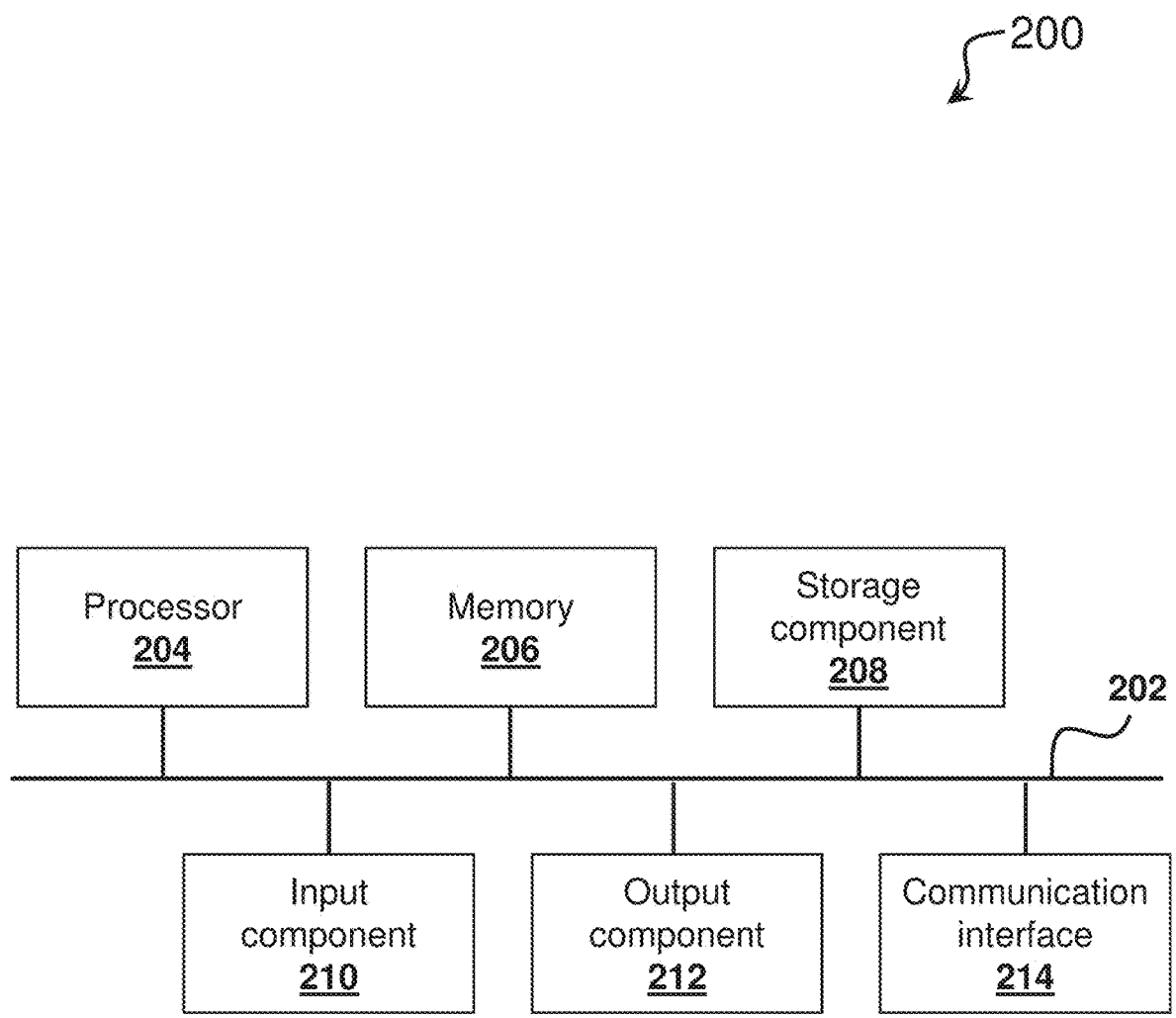
FIG. 2 is a diagram of one or more components, devices, and/or systems, according to some non-limiting embodiments or aspects.

Referring now to FIG. 2, shown is a diagram of example components of a device 200, according to some non-limiting embodiments or aspects. Device 200 may correspond to one or more devices of the networked computer system 101, system components 104, monitoring system 102, user device 106, database 110, and/or communication network 108, as shown in FIG. 1. In some non-limiting embodiments or aspects, such systems or devices may include at least one device 200 and/or at least one component of device 200. The number and arrangement of components shown in FIG. 2 are provided as an example. In some non-limiting embodiments or aspects, device 200 may include additional components, fewer components, different components, or differently arranged components than those shown in FIG. 3. Additionally, or alternatively, a set of components (e.g., one or more components) of device 200 may perform one or more functions described as being performed by another set of components of device 200.

As shown in FIG. 2, device 200 may include a bus 202, a processor 204, memory 206, a storage component 208, an input component 210, an output component 212, and a communication interface 214. Bus 202 may include a component that permits communication among the components of device 200. In some non-limiting embodiments or aspects, processor 204 may be implemented in hardware, firmware, or a combination of hardware and software. For example, processor 204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 206 may include random access memory (RAM), read only memory (ROM), and/or another type of dynamic or static storage device (e.g., flash memory, magnetic memory, optical memory, etc.) that stores information and/or instructions for use by processor 204.

With continued reference to FIG. 2, storage component 208 may store information and/or software related to the operation and use of device 200. For example, storage component 208 may include a hard disk (e.g., a magnetic disk, an optical disk, a magneto-optic disk, a solid state disk, etc.) and/or another type of computer-readable medium. Input component 210 may include a component that permits device 200 to receive information, such as via user input (e.g., a touch screen display, a keyboard, a keypad, a mouse, a button, a switch, a microphone, etc.). Additionally, or alternatively, input component 210 may include a sensor for sensing information (e.g., a global positioning system (GPS) component, an accelerometer, a gyroscope, an actuator, etc.). Output component 212 may include a component that provides output information from device 200 (e.g., a display, a speaker, one or more light-emitting diodes (LEDs), etc.). Communication interface 214 may include a transceiver-like component (e.g., a transceiver, a separate receiver and transmitter, etc.) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium may include any non-transitory memory device. A memory device includes memory space located inside of a single physical storage device or memory space spread across multiple physical storage devices. Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally, or alternatively, hardwired circuitry may be used in place of or in combination with software instructions to perform one or more processes described herein. Thus, embodiments or aspects described herein are not limited to any specific combination of hardware circuitry and software. The term "programmed or configured," as used herein, refers to an arrangement of software, hardware circuitry, or any combination thereof on one or more devices.

Figure 3:
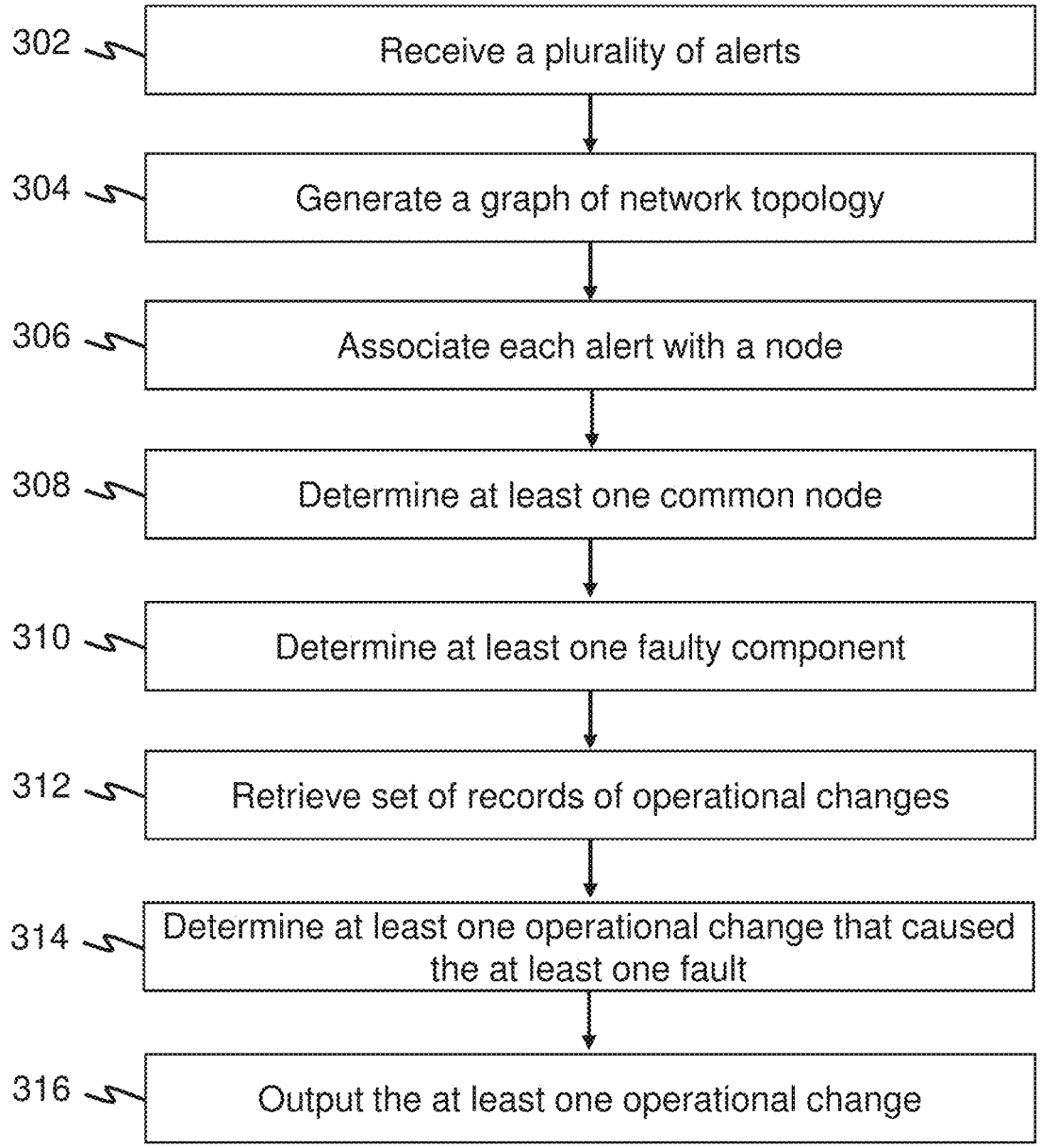
FIG. 3 is a flow diagram of a method for diagnosing faulty components in networked computer systems, according to some non-limiting embodiments or aspects.

Referring now to FIG. 3, a flow diagram of a method 300 for diagnosing faulty components in networked computer systems is shown, according to some non-limiting embodiments or aspects of the present disclosure. The method may be performed by one or more processors of monitoring system 102, networked computer system 101, and/or other computing device. One or more steps performed by a first processor may be performed by a same or different processor.

In step 302, a plurality of alerts may be received. For example, monitoring system 102 may receive a plurality of alerts associated with at least one fault in a networked computer system. Receiving an alert may include receiving an alert from an outside system and/or system component 104. Receiving an alert may further include directly detecting a fault in one or more system components 104 of the networked computer system 101.

In step 304, a graph of network topology may be generated. For example, monitoring system 102 may generate a graph of network topology of the networked computer system 101 that includes a plurality of nodes (e.g., points) connected by a plurality of edges (e.g., connecting lines). Each node of the plurality of nodes may represent one or more system components 104 (e.g., at least one of a hardware component or a software component) in the networked computer system 101. Each edge of the plurality of edges may represent communication between system components 104 represented by nodes connected by said edge.

In step 306, each alert may be associated with a node. For example, monitoring system 102 may associate each alert of the plurality of alerts with at least one node of the plurality of nodes to determine a set of nodes affected by the at least one fault. Each node in the set of affected nodes may be associated with one or more alerts. Each alert in the plurality of alerts may be associated with one or more nodes in the graph of network topology. The plurality of nodes of the graph of network topology may further include a first set of nodes associated with software applications (e.g., user-interfacing software components that communicate with one or more user devices), a second set of nodes associated with data storage devices (e.g., software and/or hardware components configured to store data in the networked computer system 101), and a third set of nodes that connects the first set of nodes to the second set of nodes. For example, nodes in the first set of nodes may have edges to nodes in the third set of nodes, and nodes in the third set of nodes may have edges to nodes in the second set of nodes. See FIGS. 6 and 7 for an illustrative example.

In step 308, at least one common node may be determined. For example, monitoring system 102 may determine at least one common node of the graph having a plurality of edges connected to nodes in the set of nodes affected by the at least one fault. The at least one common node may also be determined by said node having a plurality of paths (e.g., one or more edges connected in sequence) connected to nodes in the set of nodes affected by the at least one fault. The at least one common node may thereby be determined to be at least one root cause of one or more other affected system components 104.

In step 310, at least one faulty component may be determined. For example, monitoring system 102 may determine at least one faulty component of the networked computer system 101 based on the at least one common node. A system component 104 associated with a common node may be determined to be one such faulty component. While the networked computer system 101 may be said to exhibit a plurality of faulty components, the monitoring system 102 may, employing the above methodology, determine at least one faulty component that may be the proximate cause of one or more other faulty components.

In step 312, a set of records of operational changes may be retrieved. For example, monitoring system 102 may retrieve a set of records of operational changes to the networked computer system 101. The set of records may include data of operational changes to the operation of one or more system components 104 in the networked computer system 101. The set of records may be retrieved by the monitoring system 102 from one or more data stores, such as database 110.

In step 314, at least one operational change that caused the at least one fault may be determined. For example, monitoring system 102 may determine, based on the set of records and the at least one faulty component, at least one operational change that caused the at least one fault in the networked computer system 101. The monitoring system 102 may correspond to one or more aspects of operational change data with one or more aspects of the at least one faulty component to determine an operational change that causes the at least one faulty component to experience a fault. Determining the at least one operational change that caused the at least one fault may include comparing times of the operational changes of the set of records with a time period (e.g., a point in time or range of points in time) associated with the plurality of alerts. In such a comparison, operational changes implemented around and/or before the time period of the plurality of alerts may be attributed to causing the at least one fault.

In some non-limiting embodiments or aspects, the set of records may include a user access log that associates each operational change with a user of the networked computer system 101. Monitoring system 102 may be configured to determine the at least one operational change that caused the at least one fault in the networked computer system 101 by identifying a user that made an operational change to the networked computer system 101 without authorization (e.g., the user did not have the requisite permissions and/or clearance required to make an operational change).

In step 316, the at least one operational change may be output. For example, monitoring system 102 may output the at least one operational change, e.g., to a user device 106 or other computing device configured to remedy one or more faults in the networked computer system 101. The output may further be between two devices of the monitoring system 102.

Figure 4:
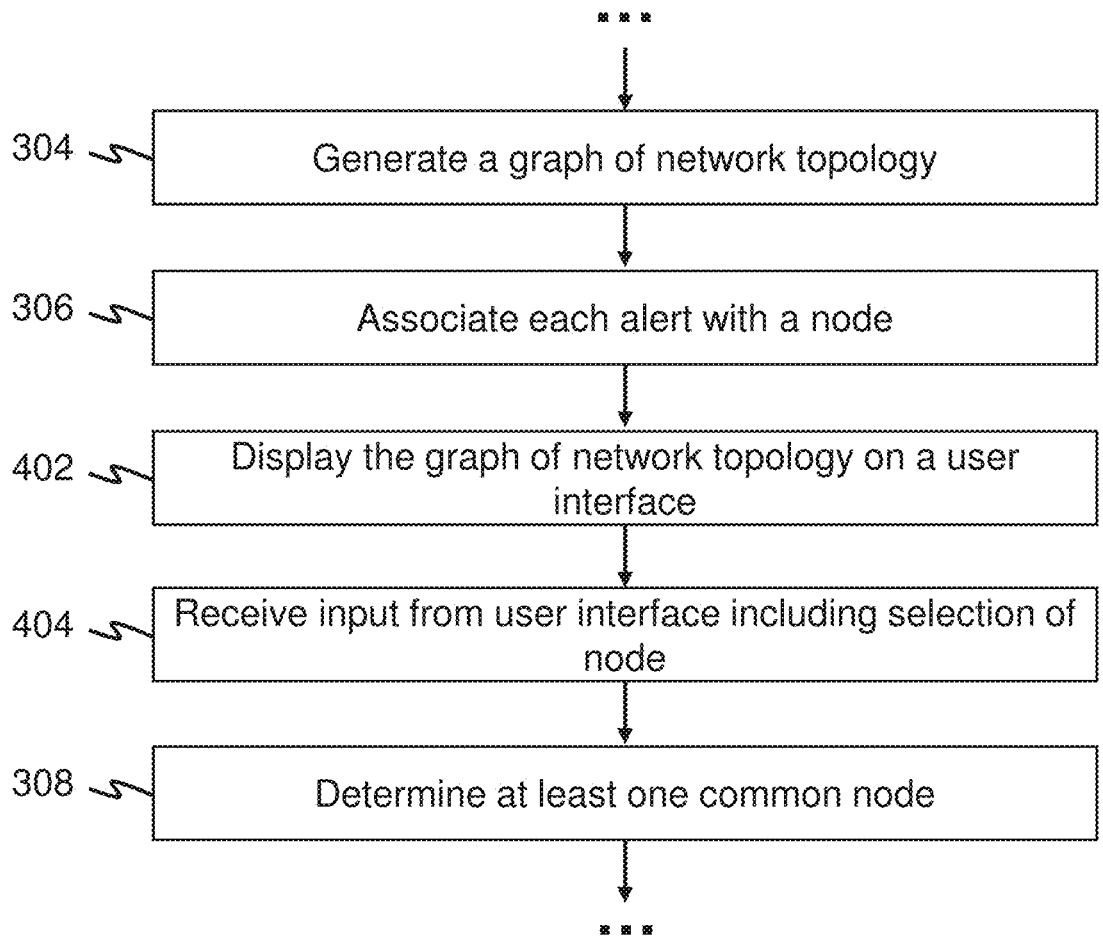
FIG. 4 is a flow diagram of a method for diagnosing faulty components in networked computer systems, according to some non-limiting embodiments or aspects.

Referring now to FIG. 4, a flow diagram of a method 400 for diagnosing faulty components in networked computer systems 101 is shown, according to some non-limiting embodiments or aspects of the present disclosure. The method may be performed by one or more processors of monitoring system 102, networked computer system 101, and/or other computing device. One or more steps performed by a first processor may be performed by a same or different processor. The steps of method 400 may be included in between the corresponding steps of method 300, depicted in FIG. 3.

In step 304, a graph of network topology may be generated. For example, monitoring system 102 may generate the graph of network topology of the networked computer system 101, as described above. In step 306, each alert may be associated with a node. For example, monitoring system 102 may associate each alert of the plurality of alerts with at least one node of the plurality of nodes to determine a set of nodes affected by the at least one fault.

After step 306, in step 402, the graph of network topology may be displayed on a user interface. For example, monitoring system 102 may display and/or cause the display of the graph of network topology on a user interface, wherein each node of the set of nodes affected by the at least one fault is visually represented as distinct from nodes that are not in the set of nodes affected by the at least one fault.

In step 404, a user input may be received from the user interface including a selection of a node. For example, monitoring system 102 may receive, via the user interface, user input including the selection of a node of the graph. The monitoring system 102 may base its determination of the at least one common node at least partly on the user input, in step 308.

Figure 5:
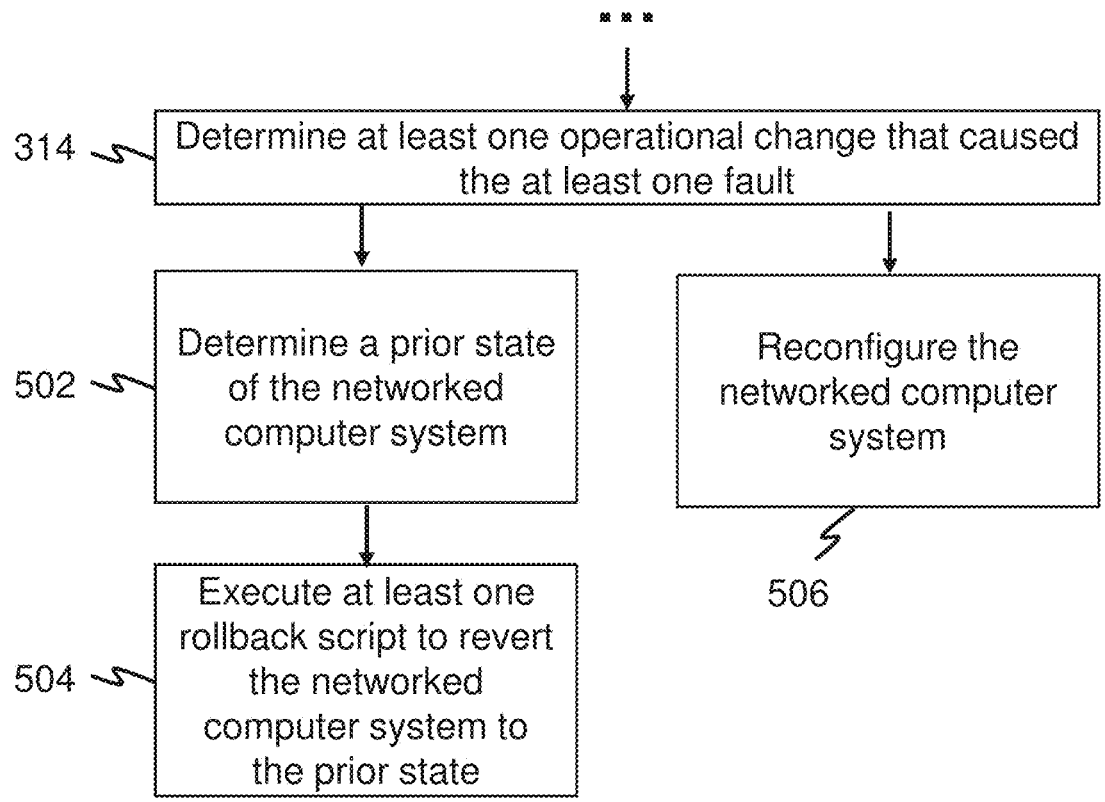
FIG. 5 is a flow diagram of a method for diagnosing faulty components in networked computer systems, according to some non-limiting embodiments or aspects.

Referring now to FIG. 5, a flow diagram of a method 500 for diagnosing faulty components in networked computer systems 101 is shown, according to some non-limiting embodiments or aspects of the present disclosure. The method may be performed by one or more processors of monitoring system 102, networked computer system 101, and/or other computing device. One or more steps performed by a first processor may be performed by a same or different processor. The steps of method 500 may be included after the corresponding step of method 300, depicted in FIG. 3.

In step 314, at least one operational change that caused the at least one fault may be determined. For example, monitoring system 102 may determine, based on the set of records and the at least one faulty component, at least one operational change that caused the at least one fault in the networked computer system 101.

In response to determining the at least one operational change in step 314, a prior state of the networked computer system 101 may be determined in step 502. For example, monitoring system 102 may determine, based on the set of records, a prior state of the networked computer system 101 before the at least one operational change was implemented.

Further in response to determining the at least one operational change in step 314, and subsequent to determining the prior state in step 502, at least one rollback script may be executed in step 504. For example, monitoring system 102 may execute at least one rollback script to revert the networked computer system 101 to the prior state.

Alternatively or in addition to step 502, after step 314, the networked computer system 101 may be reconfigured in step 506. For example, in response to determining the at least one operational change that caused the at least one fault in the networked computer system 101, monitoring system 102 may reconfigure the networked computer system 101 to isolate the at least one faulty component and to reconnect system components 104 associated with the set of nodes affected by the at least one fault to a new system component 104.

Figure 6:
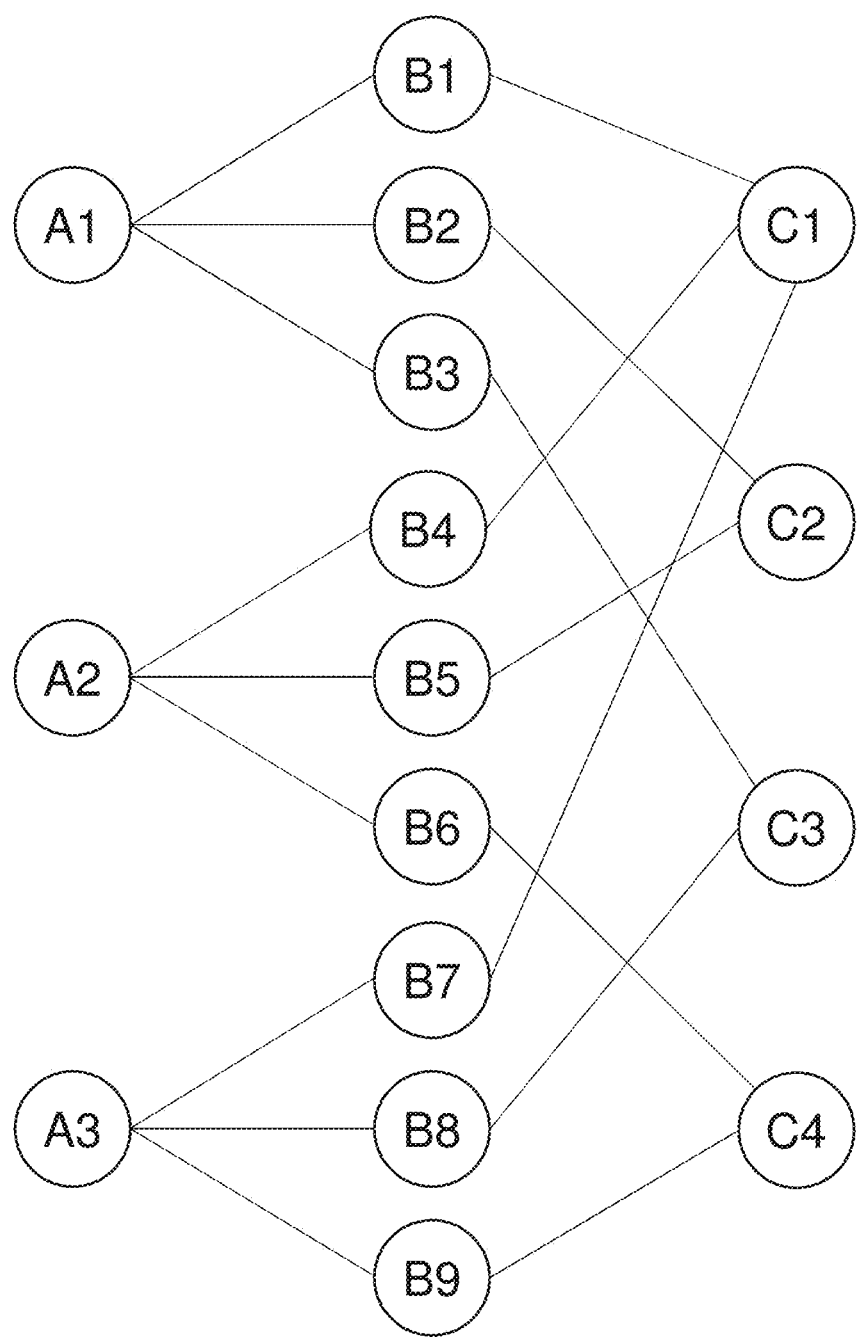
FIG. 6 is an illustrative graph of a network topology for use in a method for diagnosing faulty components in networked computer systems, according to some non-limiting embodiments or aspects.

Referring now to FIG. 6, depicted is an exemplary illustration of a graph 600 of network topology for use in a method for diagnosing faulty components in networked computer systems, according to some non-limiting embodiments or aspects of the present disclosure. The graph 600 of network topology includes a plurality of nodes A1-A3, B1-B9, C1-C4 connected by a plurality of edges. Each node of the plurality of nodes A1-A3, B1-B9, C1-C4 represents at least one system component 104 in the networked computer system 101. Each edge of the plurality of edges represents communication between system components 104 represented by nodes connected by said edge. For example, node A1 has edges connecting node A1 to nodes B1, B2, and B3. Node A1 represents at least one system component 104 that is in communication with one or more system components 104 represented by nodes B1, B2, and B3. By way of further example, node A1 is communicatively connected to node C1 by way of a path of edges connecting node A1 to node B1, and node B1 to node C1.

The plurality of nodes A1-A3, B1-B9, C1-C4 of the graph 600 of network topology may include at least three sets (e.g., communication layers) of nodes. A first set of nodes A1-A3 may be associated with (e.g., represented by system components 104 comprising) software applications. A second set of nodes C1-C4 may be associated with data storage devices. A third set of nodes B1-B9 may connect the first set of nodes A1-A3 to the second set of nodes C1-C4 via a plurality of edges. For example, a software application associated with the system component 104 represented by node A3 is communicatively connected with the data storage device associated with the system component 104 represented by node C1, via a system component 104 represented by node B7. It will be appreciated that a fault occurring in one system component of the networked computer system 101 may affect other system components 104 to which the faulty system component is connected. The possible communicative connections resulting in one system component 104 affecting another are represented by the edges connecting nodes A1-A3, B1-B9, C1-C4 in the graph 600.

The graph 600 depicted in FIG. 6 may be considered to be a depiction of an operational state of the networked computer system 101. Graph 600 may depict a network computer system 101 that is experiencing no faults. The graph 600 may be displayed to a user in a user interface of a user device 106. The user may be able to select one or more nodes A1-A3, B1-B9, C1-C4 of the graph 600 using an input device of the user device 106.

Referring now to FIG. 7, depicted is an exemplary illustration of a graph 700 of network topology for use in a method for diagnosing faulty components in networked computer systems, according to some non-limiting embodiments or aspects of the present disclosure. The graph 700 of network topology shown in FIG. 7 is illustrative of the same networked computer system 101 of the graph 600 shown in FIG. 6, but where faults are occurring in the networked computer system 101. The graph 700 may be generated by associating each alert of a plurality of alerts with at least one node A1-A3, B1-B9, C1-C4 of the graph 700, so as to determine a set of nodes affected by the at least one fault.

When displayed graphically in a user interface, the set of affected nodes A1-A3, B1, B3, B4, B7, C1, C2 may be depicted as visually distinct, so as to set apart the set of affected nodes A1-A3, B1, B3, B4, B7, C1, C3 from the set of unaffected nodes B2, B5, B6, B8, B9, C2, C4.

Once the set of affected nodes A1-A3, B1, B3, B4, B7, C1, C3 is determined, the monitoring system 102 may determine at least one common node of the graph having a plurality of edges connected to nodes in the set of affected nodes A1-A3, B1, B3, B4, B7, C1, C3. Monitoring system 102 may make this determination automatically, such as by identifying a node with the most paths and/or edges to other nodes in the set of affected nodes A1-A3, B1, B3, B4, B7, C1, C3. For example, the monitoring system 102 may determine node C1 to be at least one common node. The monitoring system 102 may determine that node C1 has a plurality of edges connected to other affected nodes, including nodes B1, B4, and B7. Alternatively or additionally, the monitoring system 102 may determine that node C1 has a plurality of paths connected to other affected nodes, including nodes A1, B1, A2, B4, A3, and B7. In this manner, monitoring system 102 may determine that node C1, due to itself being associated with an alert/fault and being connected to so many other affected nodes, is a root cause of the at least one fault in the networked computer system 101.

By way of comparison, node C3 has only one direct edge to another affected node, node B3. Moreover, node C3 has only two affected nodes connected by paths, namely, nodes A1 and B3. Therefore, node C3 may be associated with a separate fault in the system. If the fault is said to occur in a storage device, the fault associated with node A1 may be associated with either node C1 or node C3. Under the same scenario, the fault associated with node B3 may be only associated with node C3. Therefore, the monitoring system 102 may determine faulty components associated with node C1 and/or node C3. When identifying multiple common nodes, monitoring system 102 may address each faulty component associated with a common node based on the number of edges/paths. For example, issues associated with node C1 may be resolved before issues with node C3. It will be appreciated that many arrangements of a graph of network topology are provided for by the present disclosure.

Figure 8:
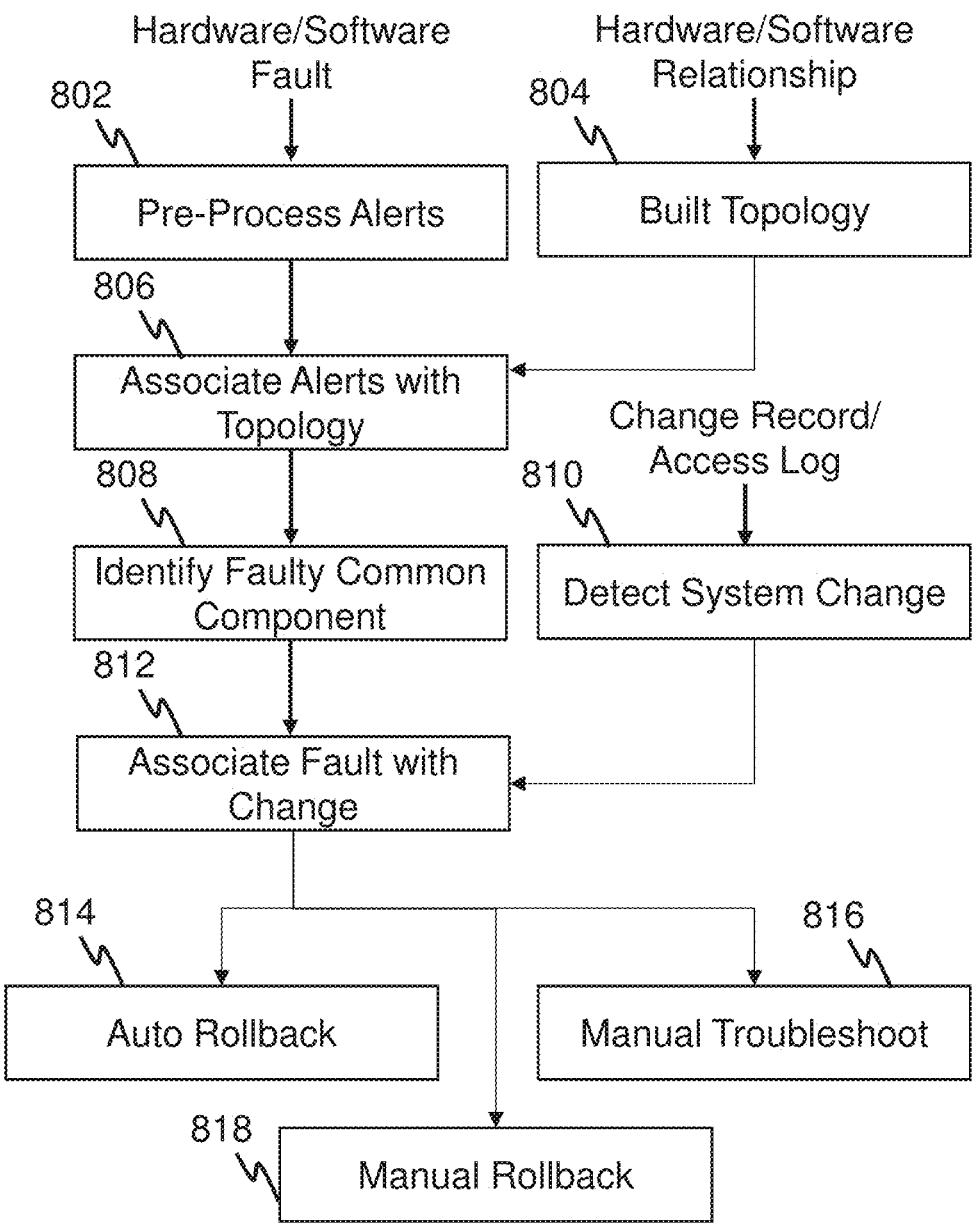
FIG. 8 is a flow diagram of a method for diagnosing faulty components in networked computer systems, according to some non-limiting embodiments or aspects.

Referring now to FIG. 8, depicted is a flow diagram of a method 800 for diagnosing faulty components in networked computer systems, according to some non-limiting embodiments or aspects of the present disclosure. The method 800 may be performed by one or more processors of a monitoring system 102, networked computer system 101, and/or other computing device. One or more steps may be performed by a same or different computing device.

In step 802, received alerts may be pre-processed. For example, in response to hardware and/or software faults, monitoring system 102 may de-duplicate the plurality of alerts so that one alert per node is identified. Furthermore, alerts may be reformatted so that each alert is in the same format. Moreover, alerts may be enriched with additional data, such as to add data to the alert message that includes an identifier of a system component for which the alert is related. Other data relating to a fault (e.g., error messages) may be added to the alert.

In step 804, a network topology may be built. For example, based on the relationship of hardware and software in the networked computer system 101, monitoring system 102 may generate a graph of network topology, as described above. In step 806, the alerts may be associated with the graph of network topology. For example, each alert of the plurality of alerts may be associated with at least one node of the plurality of nodes of the graph of network topology. In this manner, a set of affected nodes may be determined.

In step 808, a faulty common component may be identified. For example, monitoring system 102 may determine at least one common node of the graph having a plurality of edges connected to nodes in the set of affected nodes, and based on the at least one common node, determine at least one faulty component (e.g., by association of one or more system components 104 with the at least one common node).

In step 810, a system change may be detected. For example, monitoring system 102 may track operational changes to the networked computer system 101 in a set of records of operational changes. The set of records may include a change record and/or a user access log, as described above. Based on the identification of the at least one faulty component and the detected system changes in steps 808 and 810, respectively, a fault may be associated with a change, in step 812. For example, monitoring system 102 may compare parameters of the faulty component with parameters of the system changes (e.g., affected system component 104 device identifiers, alert times and change times, etc.) to identify commonalities that indicate that the system change caused the faulty component. In some non-limiting embodiments or aspects, monitoring system 102 may determine the at least one operational change that caused the at least one fault in the networked computer system 101 by comparing times of the operational changes to a time period associated with the plurality of alerts, and identifying a system change from around/before the time period of when the alerts occurred.

In response to the association of a fault with a system change, in step 812, one or more restorative/reparative steps may be executed, in a mitigation process. The mitigation process may include: automatic rollback of the networked computer system 101, in step 814; manual troubleshooting of the networked computer system 101, in step 816; and/or manual rollback of the networked computer system 101, in step 818.

When executing an automatic rollback, in step 814, the monitoring system 102 may execute one or more rollback scripts to revert the networked computer system 101 to a prior state (e.g., prior version) from a time before the operational change that caused the fault was implemented. Additionally or alternatively, rollback of the networked computer system 101 may be conducted manually, in step 818, where user input is used to configure the networked computer system 101 in a prior state.

The mitigation process may include manual troubleshooting, in step 816, such as where a user is presented with the identified faulty component and the change that caused the faulty component, but the user is relied upon to reconfigure the networked computer system 101 and resolve the fault(s). This process may be preferred in situations where rollback is not possible or feasible given the complexity of the system, the number of operational changes to revert, and/or the like.

Figure 9:
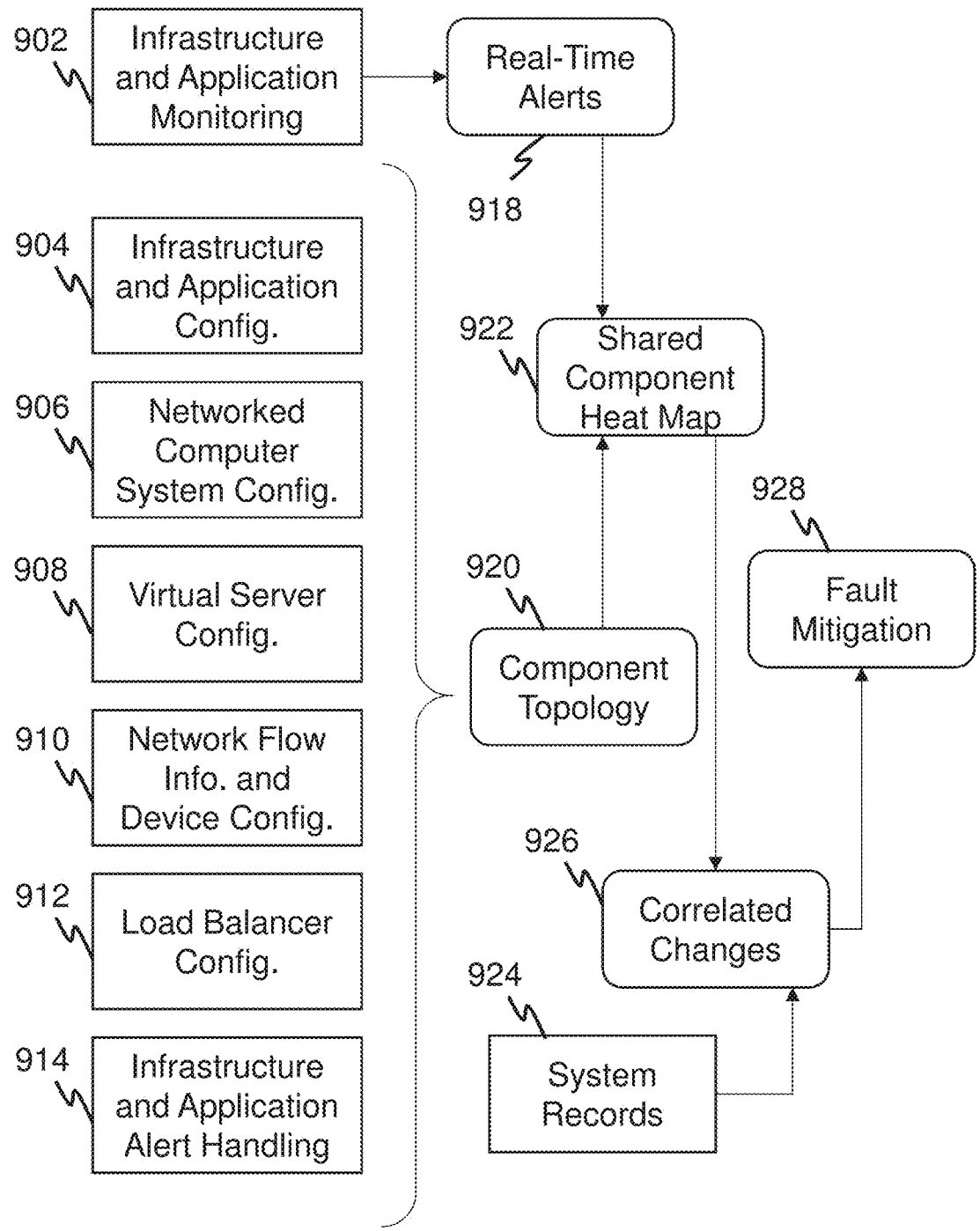
FIG. 9 is a combined schematic and flow diagram of a system and method for diagnosing faulty components in networked computer systems, according to some non-limiting embodiments or aspects.

Referring now to FIG. 9, depicted is a schematic and flow diagram of a system and method for diagnosing faulty components in networked computer systems, according to some non-limiting embodiments or aspects of the present disclosure. The process of generating a graph of network topology, associating alerts with nodes, determining faulty components, and mitigating faults may include pooled data from a number of different data sources. For example, receipt of a plurality of alerts associated with at least one fault in a networked computer system, in step 918, may be facilitated by an infrastructure and application monitoring system 902 (e.g., Netcool®). A number of data sources may be combined to determine the topology of a networked computer system 101 and facilitate the generation of a graph of network topology, in step 920. Such data sources may include: infrastructure and application configuration 904 (e.g., from a configuration management database (CMDB)); networked computer system configuration 906 (e.g., via a data center infrastructure management (DCIM) system, such as NLYTE®); virtual server configuration 908 (e.g., via a centralized management utility, such as vCenter Server®); network flow information and device configuration 910 (e.g., including information about firewall, router, and switch configurations, such as via Fluke Networks®, Netscout®, and Riverbed®); load balancer configuration 912 (e.g., via a network utility); and infrastructure and alert handling software 914 (e.g., via Splunk®).

In response to and based on the real-time alerts received in step 918 and the component topology generated in step 920, a shared component heat map may be generated in step 922. Generating a shared component heat map may result from generating the graph of network topology and associating each alert of the plurality of alerts with at least one node of the plurality of nodes, wherein nodes associated with the most alerts, connections to faulty components, and/or the like are represented by a greatest intensity in the heat map. In response to and based on the shared component heat map in step 922, and based on a set of records of operational changes received in step 924, changes may be correlated with faulty components in step 926. In this manner, operational changes that resulted in faulty components may be identified. In step 928, once operational changes that resulted in faulty components are identified, the faults may be mitigated by addressing the operational changes (e.g., rolling back changes, reconfiguring the networked computer system 101, etc.).

Figure 10:
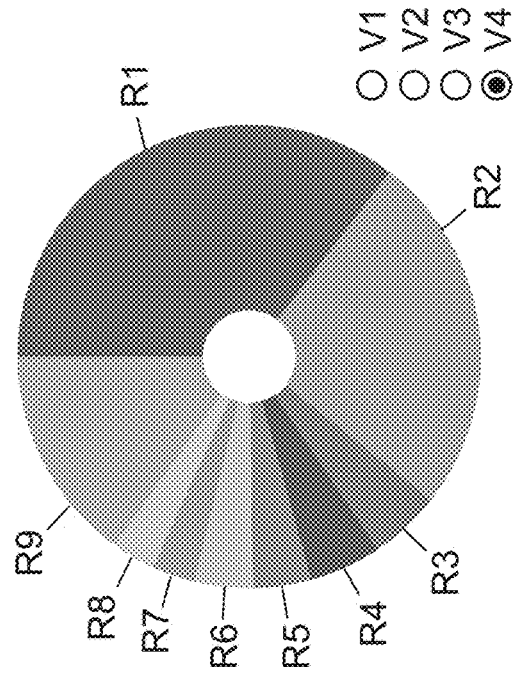
FIG. 10 is a schematic diagram of a user interface for use in a system and method for diagnosing faulty components in networked computer systems, according to some non-limiting embodiments or aspects.
Figure 10:
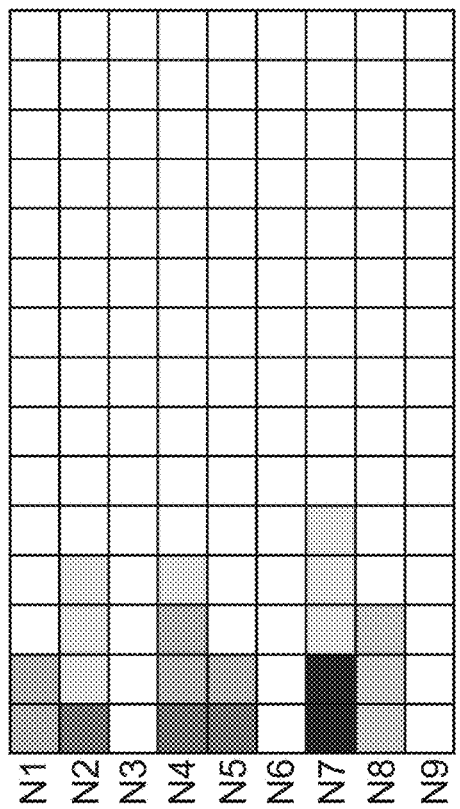
Figure 10:
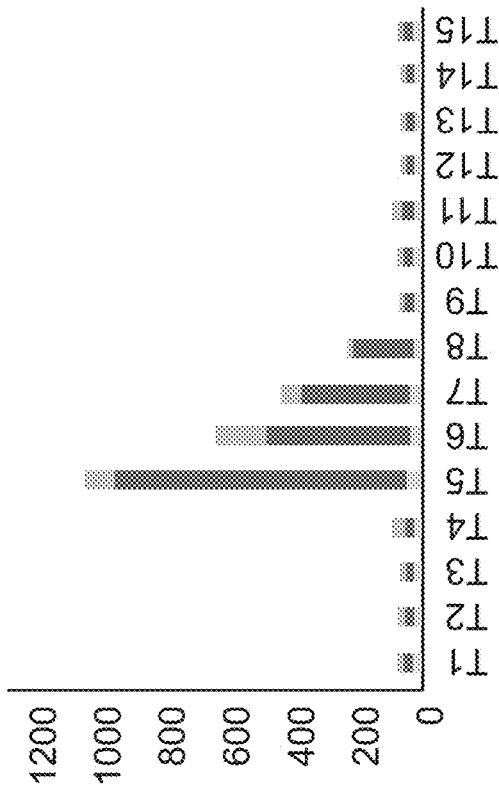

Referring now to FIG. 10, depicted is a schematic diagram of a user interface for use in a system and method for diagnosing faulty components in networked computer systems, according to some non-limiting embodiments or aspects of the present disclosure. The user interface may be generated by software on a display of a user device 106, to assist with diagnosing faulty components in a networked computer system. User interface may additionally include a visual representation of affected network nodes, as depicted in FIG. 6 and FIG. 7. The user interface is depicted in FIG. 10 to include a number of configurations for displaying alert and network fault data. For example, the user interface may include an alert trend portion, an alert distribution portion, an alert details portion, and a commonality analysis portion. It will be appreciated that the portions of the user interface are depicted for the purposes of illustration and are not to be taken as limiting.

The alert trend portion may include a bar graph depicting alerts over time. The y-axis of the bar graph may represent number of alerts (e.g., 0-1200), and the x-axis of the bar graph may represent a time interval (e.g., three minutes, ten minutes, hour, etc., depicted herein as time intervals T1-T15, for example) in which the alerts occurred. The bars of the bar graph may be visually segmented (e.g., by color, brightness, saturation, etc.) to correspond with the relative amount of alerts attributed to a respective alert category (e.g., alert location, alert type, service lane, alert ID, affected system component, etc.). Sudden increases in alerts on the alert trend bar graph (such as shown approximately in time intervals T5-T8) may be indicative of a network fault event. The alert trend portion may also depict a total number of alerts in the overall time interval (e.g., including all intervals T1-T15) as a numerical tracker (e.g., 8785 alerts).

The alert distribution portion may include a pie chart depicting proportion of alerts according to alert category (depicted herein as R1-R9, though more or fewer categories may be used). For example, the largest proportion of the alerts as depicted are attributed to alert category R1, and the smallest proportion of alerts as depicted are attributed to alert categories R7 and R8. A portion of the pie chart may be allocated to grouping a number of alert categories (e.g., such as an "other" category, shown as R9).

The pie chart may be visually segmented (e.g., by color, brightness, etc.) to correspond with the relative amount of alerts attributed to a respective alert category. The visual representation that distinguishes the segments of the pie chart may directly correspond with the visual representation that distinguishes the segments of the bar graph of the alert trend portion.

The user interface may further include a filter to update the display according to alert category. This may be depicted, for example, as a series of selection controls V1-V4. Each selection control may update the user interface to show the alerts to be categorized according to a different category. For example, V1 may correspond to alert location, V2 may correspond to alert type, V3 may correspond to service lane, and V4 may correspond to alert ID. Selecting a different control V1-V4 may cause the user interface to refresh one or more of the portions to reflect the selected alert category.

The alert details portion may include a table providing further details of each alert (e.g., records of alerts represented as rows). The table may include a number of columns that display alert data for each alert, including, but not limited to, affected network node, severity of the alert (e.g., a categorical label, such as out of 1 to 5), an alert summary (e.g., a short description), an affected service (e.g., of a transaction service provider), an alert origin location (e.g., in the network), an event ID (e.g., an identifier for a process connected to one or more alerts), an event name (e.g., a short descriptor of a process connected to one or more alerts), and a ticket identifier (e.g., to represent a support ticket for rectifying one or more system faults connected to the specific alert). More or fewer columns may be depicted. The user may be provided with a searchable text field (e.g., a filter field) to search and sort the rows of alerts by individual columns. The rows may be visually represented (e.g., by color, brightness, saturation, etc.) according to the severity of the alert (e.g., red for severity level 5, orange for severity level 4, yellow for severity level 3, green for severity level 2, blue for severity level 1, etc.). The table may include a scrollbar and may be paginated for ease of viewing and navigating alert records.

The commonality analysis portion may include a grid display to visually represent categories of system components (e.g., groupings of hardware and/or software) by which the most affected categories can be readily identified. Each row of grid squares may correspond to a network category (e.g., load balancer, network, switch, operating system, host, storage array, cluster, blade enclosure, etc., depicted herein as N1-N9, though more or fewer categories may be used). Each grid square may correspond to a system component (e.g., hardware and/or software) that corresponds to the network category and may be visually represented (e.g., color, brightness, saturation, etc.) according to the number of alerts attributed to the system component. For example, components (grid squares) with a relatively low amount of alerts (e.g., 100 or fewer alerts, though the number may vary according to system baselines) attributed to them may be given a low-intensity color (e.g., pale yellow), brightness (e.g., light), or saturation (e.g., low saturation). Components with a relatively high amount of alerts (e.g., 2000 or more alerts, though the number may vary according to system baselines) attributed to them may be given a high-intensity color (e.g., red), brightness (e.g., dark), or saturation (e.g., high saturation). The visual representation may be shown along a gradient of intensity values between high and low according to alert count value. Grid squares may be organized from left to right according to system components with the highest number of alerts being farthest left. For example, system component N7 is depicted as having the highest number (e.g., highest intensity) of alerts. System components N3, N6, and N9 are depicted as having no system components with a high number (e.g., high intensity) of alerts. The grid squares may be further populated with information, such as alert count and system component identifier.

Figure 11:
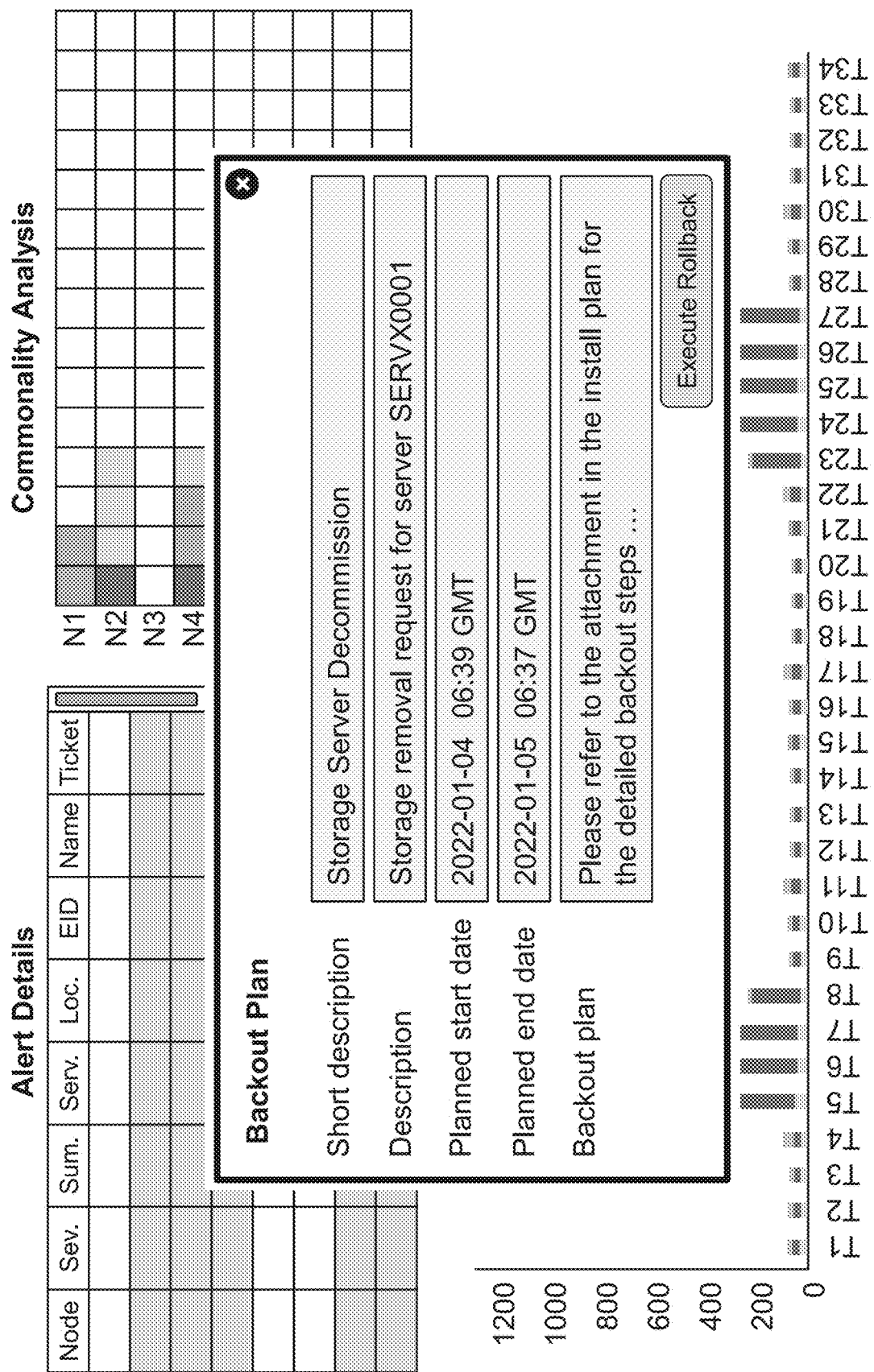
FIG. 11 is a schematic diagram of a user interface for use in a system and method for diagnosing faulty components in networked computer systems, according to some non-limiting embodiments or aspects.

Referring now to FIG. 11, depicted is a schematic diagram of a user interface for use in a system and method for diagnosing faulty components in networked computer systems, according to some non-limiting embodiments or aspects of the present disclosure. The user interface of FIG. 11 shows another possible arrangement of the alert details portion, commonality analysis portion, and alert trend portion, where the alert trend has been moved to the bottom and elongated to encompass the bottom half of the user interface. The alert distribution is not shown in FIG. 11. It will be appreciated that the user interface may show one or more of the above-described portions in one or more arrangements thereof.

FIG. 11 further depicts a window for executing a rollback of the networked computer system once an operational change has been identified as contributing to one or more system faults. The operational change may be rolled back according to a specific "backout plan," also called a rollback plan. The depicted window includes fields for identifying one or more parameters of the backout plan for the rollback, including short description, description, planned start date, planned end date, and backout plan. The short description may be a text field in which the user may provide a short name by which to identify the rollback. For example, if a storage server was identified as faulty and needs to be disconnected from the system, the backout plan may be given the short description of "Storage Server Decommission." A more full description may be provided in a text field below, by which the user may provide a fuller name by which to identify the rollback (e.g., "Storage removal request for server SERVX0001"). The backout plan window further includes date and time fields by which to identify the start and end of the rollback to be executed (e.g., a start date of Jan. 4, 2022, at 06:39 GMT, and an end date of Jan. 5, 2022, at 06:37 GMT). The backout plan further includes a field by which the details of the rollback operation can be fully described. As shown, the user has saved a fuller plan in association with the rollback by which others may refer to the detailed steps of the rollback. It will be appreciated that the above described backout plan window is provided for exemplary purposes and is not to be taken as limiting.

Although the disclosure has been described in detail for the purpose of illustration based on what is currently considered to be the most practical and preferred embodiments or aspects, it is to be understood that such detail is solely for that purpose and that the disclosure is not limited to the disclosed embodiments or aspects, but, on the contrary, is intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect, and one or more steps may be taken in a different order than presented in the present disclosure.

What is claimed is:

1. A computer-implemented method comprising:
    generating, with at least one processor, a graph of a network topology of a networked computer system, the graph comprising a plurality of nodes connected by a plurality of edges;
    determining, with at least one processor, a set of nodes of the graph affected by at least one fault in the networked computer system based on at least one alert associated with the set of nodes;
    determining, with at least one processor, at least one faulty component of the networked computer system based on at least one common node having a plurality of edges connected to nodes in the set of nodes affected by the at least one fault;
    retrieving, with at least one processor, a set of records of operational changes to the networked computer system;
    determining, with at least one processor, based on the set of records and the at least one faulty component, at least one operational change that caused the at least one fault in the networked computer system, wherein determining the at least one operational change that caused the at least one fault in the networked computer system further comprises comparing times of the operational changes with a time period associated with the at least one alert; and
    resetting, with at least one processor, the networked computer system to a prior state before the at least one operational change.

2. The computer-implemented method of claim 1, wherein the plurality of nodes of the graph of the network topology comprises a first set of nodes associated with software applications, a second set of nodes associated with data storage devices, and a third set of nodes that connects the first set of nodes to the second set of nodes.

3. The computer-implemented method of claim 2, further comprising:
    displaying, with at least one processor, the graph of the network topology on a user interface, wherein each node of the set of nodes affected by the at least one fault is visually represented as distinct from nodes that are not in the set of nodes affected by the at least one fault; and
    determining, with at least one processor, the at least one common node based at least partly on an input in the user interface comprising a selection of a node of the graph.

4. The computer-implemented method of claim 1, wherein resetting the networked computer system to the prior state comprises:
    determining, based on the set of records, the prior state of the networked computer system before the at least one operational change was implemented; and
    executing at least one rollback script to revert the networked computer system to the prior state.

5. The computer-implemented method of claim 4, wherein the at least one rollback script comprises a plurality of rollback scripts, each rollback script of the plurality of rollback scripts being associated with a state of a plurality of states of the networked computer system, and each state of the plurality of states being prior to a current state of the networked computer system.

6. The computer-implemented method of claim 1, wherein the set of records further comprises a user access log that associates each operational change with a user of the networked computer system, and wherein determining the at least one operational change that caused the at least one fault in the networked computer system further comprises identifying the user that made an operational change to the networked computer system without authorization.

7. The computer-implemented method of claim 1, further comprising, in response to determining the at least one operational change that caused the at least one fault in the networked computer system, reconfiguring, with at least one processor, the networked computer system to isolate the at least one faulty component and to reconnect components associated with the set of nodes affected by the at least one fault to a new component.

8. A system comprising at least one hardware processor programmed or configured to:
   generate a graph of a network topology of a networked computer system, the graph comprising a plurality of nodes connected by a plurality of edges;
   determine a set of nodes of the graph affected by at least one fault in the networked computer system based on at least one alert associated with the set of nodes;
   determine at least one faulty component of the networked computer system based on at least one common node having a plurality of edges connected to nodes in the set of nodes affected by the at least one fault;
   retrieve a set of records of operational changes to the networked computer system;
   determine, based on the set of records and the at least one faulty component, at least one operational change that caused the at least one fault in the networked computer system, wherein, when determining the at least one operational change that caused the at least one fault in the networked computer system, the at least one hardware processor is programmed or configured to compare times of the operational changes with a time period associated with the at least one alert; and
   reset the networked computer system to a prior state before the at least one operational change.

9. The system of claim 8, wherein the plurality of nodes of the graph of the network topology comprises a first set of nodes associated with software applications, a second set of nodes associated with data storage devices, and a third set of nodes that connects the first set of nodes to the second set of nodes.

10. The system of claim 9, wherein the at least one hardware processor is further programmed or configured to:
    display the graph of the network topology on a user interface, wherein each node of the set of nodes affected by the at least one fault is visually represented as distinct from nodes that are not in the set of nodes affected by the at least one fault; and
    determine the at least one common node based at least partly on an input in the user interface comprising a selection of a node of the graph.

11. The system of claim 8, wherein, when resetting the networked computer system to the prior state, the at least one hardware processor is programmed or configured to:
    determine, based on the set of records, the prior state of the networked computer system before the at least one operational change was implemented; and
    execute at least one rollback script to revert the networked computer system to the prior state.

12. The system of claim 11, wherein the at least one rollback script comprises a plurality of rollback scripts, each rollback script of the plurality of rollback scripts being associated with a state of a plurality of states of the networked computer system, and each state of the plurality of states being prior to a current state of the networked computer system.

13. The system of claim 8, wherein the set of records further comprises a user access log that associates each operational change with a user of the networked computer system, and wherein, when determining the at least one operational change that caused the at least one fault in the networked computer system, the at least one hardware processor is further programmed or configured to identify the user that made an operational change to the networked computer system without authorization.

14. The system of claim 8, wherein the at least one hardware processor is further programmed or configured to, in response to determining the at least one operational change that caused the at least one fault in the networked computer system, reconfigure the networked computer system to isolate the at least one faulty component and to reconnect components associated with the set of nodes affected by the at least one fault to a new component.

15. A computer program product comprising at least one non-transitory computer-readable medium including program instructions that, when executed by at least one hardware processor, cause the at least one hardware processor to:
    generate a graph of a network topology of a networked computer system, the graph comprising a plurality of nodes connected by a plurality of edges;
    determine a set of nodes of the graph affected by at least one fault in the networked computer system based on at least one alert associated with the set of nodes;
    determine at least one faulty component of the networked computer system based on at least one common node having a plurality of edges connected to nodes in the set of nodes affected by the at least one fault;
    retrieve a set of records of operational changes to the networked computer system;
    determine, based on the set of records and the at least one faulty component, at least one operational change that caused the at least one fault in the networked computer system, wherein, when determining the at least one operational change that caused the at least one fault in the networked computer system, the at least one hardware processor is programmed or configured to compare times of the operational changes with a time period associated with the at least one alert; and
    reset the networked computer system to a prior state before the at least one operational change.

16. The computer program product of claim 15, wherein the plurality of nodes of the graph of the network topology comprises a first set of nodes associated with software applications, a second set of nodes associated with data storage devices, and a third set of nodes that connects the first set of nodes to the second set of nodes.

17. The computer program product of claim 15, wherein the program instructions further cause the at least one hardware processor to, in response to determining the at least one operational change that caused the at least one fault in the networked computer system:
    determine, based on the set of records, the prior state of the networked computer system before the at least one operational change was implemented; and execute at least one rollback script to revert the networked computer system to the prior state.

18. The computer program product of claim 17, wherein the at least one rollback script comprises a plurality of rollback scripts, each rollback script of the plurality of rollback scripts being associated with a state of a plurality of states of the networked computer system, and each state of the plurality of states being prior to a current state of the networked computer system.

19. The computer program product of claim 15, wherein the set of records further comprises a user access log that associates each operational change with a user of the networked computer system, and wherein the program instructions that cause the at least one hardware processor to determine the at least one operational change that caused the at least one fault in the networked computer system further cause the at least one hardware processor to identify the user that made an operational change to the networked computer system without authorization.

20. The computer program product of claim 15, wherein the program instructions further cause the at least one hardware processor to, in response to determining the at least one operational change that caused the at least one fault in the networked computer system, reconfigure the networked computer system to isolate the at least one faulty component and to reconnect components associated with the set of nodes affected by the at least one fault to a new component.

* * * * *